United States Patent
Kizu et al.

(10) Patent No.: US 6,732,144 B1
(45) Date of Patent: May 4, 2004

(54) COMMUNICATION METHOD FOR DATA SYNCHRONIZATION PROCESSING AND ELECTRONIC DEVICE THEREFOR

(75) Inventors: Sachio Kizu, Yokohama (JP); Tetsuro Muranaga, Yokohama (JP); Yoshiaki Takabatake, Yokohama (JP); Shigeyasu Natsubori, Yokohama (JP); Toru Imai, Fuchu (JP); Shinya Amano, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 649 days.

(21) Appl. No.: 09/713,249

(22) Filed: Nov. 16, 2000

(30) Foreign Application Priority Data

Nov. 19, 1999 (JP) .......................... 11-330235

(51) Int. Cl.[7] .............................................. G06F 15/16
(52) U.S. Cl. ........................ 709/203; 709/204; 707/201
(58) Field of Search ................................ 709/203, 204, 709/227, 253; 707/201; 717/168, 169, 170, 171, 172, 173

(56) References Cited

U.S. PATENT DOCUMENTS

| | | | | |
|---|---|---|---|---|
| 5,729,735 A | * | 3/1998 | Meyering ..................... 707/10 |
| 5,758,069 A | * | 5/1998 | Olsen ......................... 713/201 |
| 5,799,306 A | * | 8/1998 | Sun et al. ..................... 707/10 |
| 5,890,156 A | * | 3/1999 | Rekieta et al. ................ 707/10 |
| 5,978,813 A | * | 11/1999 | Foltz et al. .................. 707/201 |
| 6,247,135 B1 | * | 6/2001 | Feague ....................... 713/400 |
| 6,253,209 B1 | * | 6/2001 | Chase-Salerno et al. . 707/104.1 |
| 6,269,406 B1 | * | 7/2001 | Dutcher et al. ............. 709/248 |
| 6,275,859 B1 | * | 8/2001 | Wesley et al. ............... 709/229 |
| 6,295,541 B1 | * | 9/2001 | Bodnar et al. .............. 707/203 |
| 6,301,658 B1 | * | 10/2001 | Koehler ....................... 713/155 |
| 6,308,201 B1 | * | 10/2001 | Pivowar et al. ............. 709/214 |
| 6,311,205 B1 | * | 10/2001 | Dutcher et al. ............. 709/201 |
| 6,345,308 B1 | * | 2/2002 | Abe ........................... 709/248 |
| 6,374,262 B1 | * | 4/2002 | Kodama ..................... 707/201 |

(List continued on next page.)

FOREIGN PATENT DOCUMENTS

| | | | | |
|---|---|---|---|---|
| WO | WO98/49626 | * | 11/1998 | ........... G06F/13/00 |
| WO | WO99/08190 | * | 2/1999 | ........... G06F/11/00 |

OTHER PUBLICATIONS

PR Newswire, "AnyDay.com Selects Extend Systems Enterprise Harmony Synchronization Technology for New Web-based On–line DayPlanner Service," Feb. 8, 1999, PR Newswire, pp. 1ff.*

Intelli Sync User's Guide Rev. 3.1, Puma Technology, pp. IV–IX; 1–103, "Intellisync for IBM Workpad and Palm Computing Platform Devices", 1999.

*Primary Examiner*—Zarni Maung
*Assistant Examiner*—Bradley Edelman
(74) *Attorney, Agent, or Firm*—Oblon, Spivak, McClelland, Maier & Neustadt, P.C.

(57) ABSTRACT

At member registration step, a master transmits a certificate and a priority to a slave. The certificate indicates that the slave receiving it belongs to the same data synchronization group as the master. The priority is used to solve a data conflict. At data synchronization, after it is determined that members belong to the same data synchronization group by the certificate, data synchronization processing is performed between arbitrary members in which an input device and a display device such as a wrist watch are limited. Data synchronization does not require a specific server.

21 Claims, 15 Drawing Sheets

U.S. PATENT DOCUMENTS

| | | | |
|---|---|---|---|
| 6,401,104 B1 * | 6/2002 | LaRue et al. | 707/203 |
| 6,421,686 B1 * | 7/2002 | Martin, Jr. | 707/201 |
| 6,425,126 B1 * | 7/2002 | Branson et al. | 717/168 |
| 6,430,576 B1 * | 8/2002 | Gates et al. | 707/201 |
| 6,449,622 B1 * | 9/2002 | LaRue et al. | 707/201 |
| 6,457,062 B1 * | 9/2002 | Pivowar et al. | 709/248 |
| 6,460,051 B1 * | 10/2002 | LaRue et al. | 707/201 |
| 6,466,236 B1 * | 10/2002 | Pivowar et al. | 345/835 |
| 6,487,560 B1 * | 11/2002 | LaRue et al. | 707/203 |
| 6,553,037 B1 * | 4/2003 | Pivowar et al. | 370/463 |
| 6,611,849 B1 * | 8/2003 | Raff et al. | 707/203 |
| 6,636,897 B1 * | 10/2003 | Sherman et al. | 709/248 |

\* cited by examiner

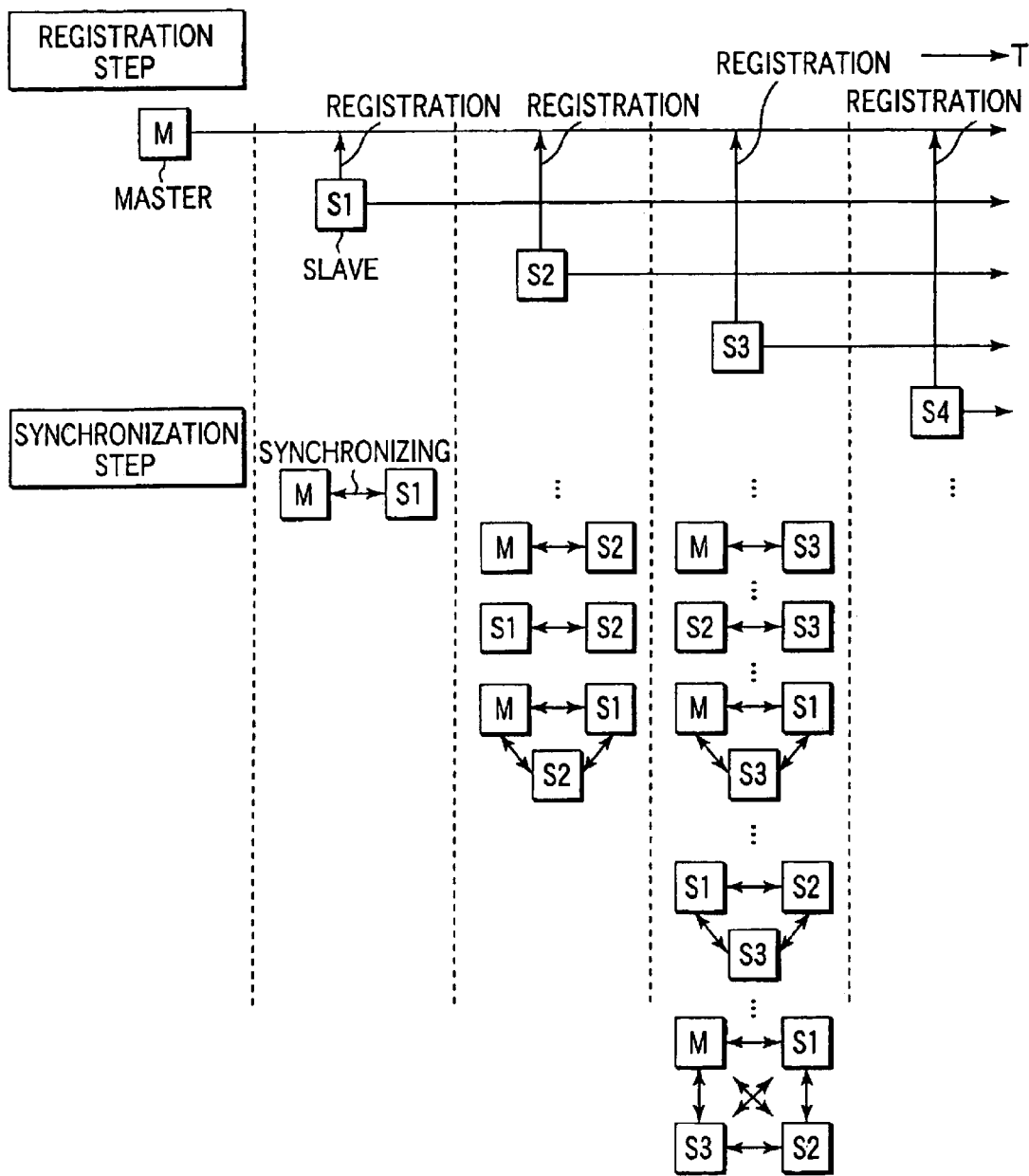
F I G. 1

| TYPE OF DATA SET | MASTER/ SLAVE | PRIORITY DATA | CERTIFICATE DATA | IDENTIFICATION DATA | COUNTER VALUE |
|---|---|---|---|---|---|
| ADDRESS DIRECTORY | MASTER | 1 | 01101110 | 10101010 | 12 |
| TIME | SLAVE | 5 | 00111010 | 01010101 | — |
| SCHEDULE | — | — | — | — | — |
| TASK LIST | — | — | — | — | — |
| E-MAIL | SLAVE | 8 | 11010011 | 11110100 | — |
| ⋮ | ⋮ | ⋮ | ⋮ | ⋮ | ⋮ |

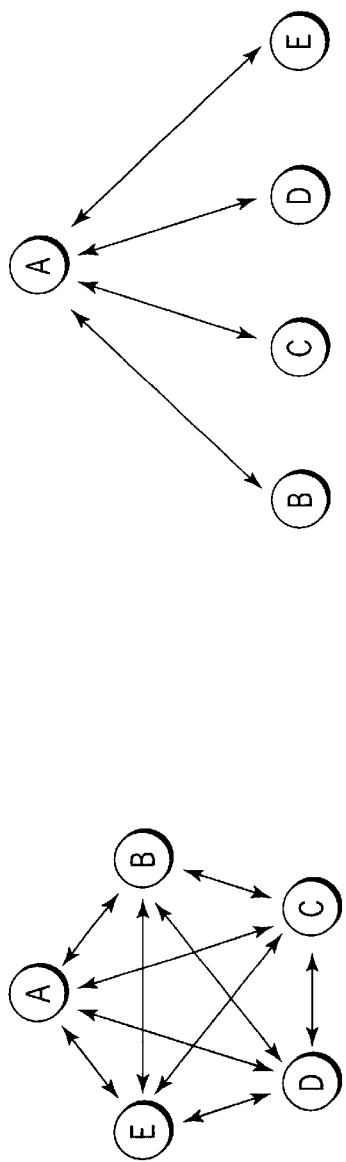
FIG. 9
FIG. 8
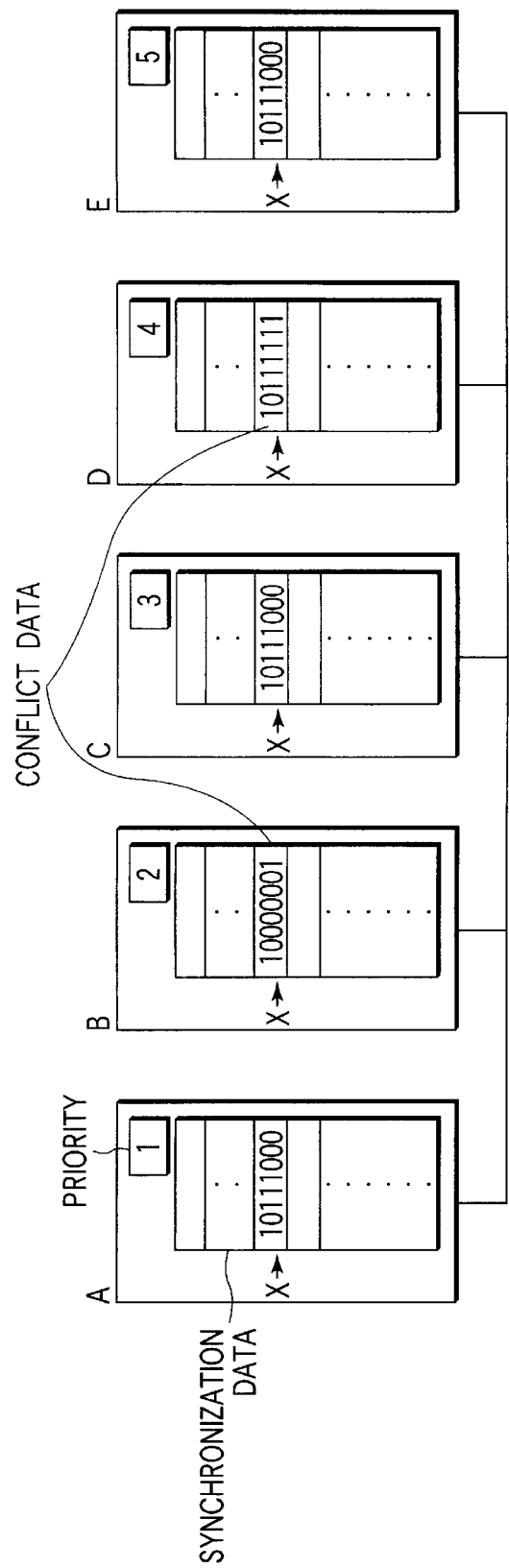
FIG. 10

COMMUNICATION METHOD FOR DATA SYNCHRONIZATION PROCESSING AND ELECTRONIC DEVICE THEREFOR

CROSS-REFERENCE TO RELATED APPLICATIONS

This application is based upon and claims the benefit of priority from the prior Japanese Patent Application No. 11-330235, filed Nov. 19, 1999, the entire contents of which are incorporated herein by reference.

BACKGROUND OF THE INVENTION

The present invention relates to a communication method for synchronously processing data between a plurality of devices and an electronic device therefor. In particular, the present invention relates to a communication method and an electronic device that have been modified so as to synchronize data in a wireless or wired network such that a network configuration is dynamically changed.

In recent years, apart from a personal computer, in a portable information processing terminal such as a portable cellular phone, a palm top computer or a wrist watch, personal data such as a telephone number (address) directory, schedule data, a task list, an E-mail can be managed and stored. Using this function, data is shared by using duplicate data in order to use the same data at home or outside as well as in office between electronic devices such as a personal computer or a portable information processing terminal. As a technique for keeping coincidence of a plurality of shared data, a data synchronization processing is known. For example, in the case where an attempt is made to share personal data such as an address directory or a schedule between a personal computer and a portable information processing terminal, duplication of data is created, and original data is held in the host and the duplicate data is held in each device other than the host. In the case where a change occurs with these items of data, the changed data is exchanged between these devices, whereby data consistency is maintained. This method is referred to as data synchronization.

As a typical computer program for data synchronization, Intelli Sync (Intelli Sync User's Guide Rev 3.1 Puma TECHNOLOGY 1999) is known. This enables data synchronization between personal computers or between a personal computer and a portable information processing terminal. This program enables data synchronization between two personal computers, one personal computer and one portable information processing terminal, or one personal computer and two portable information processing terminals.

In the case of this system, however, a device serving as a server must be participated in data synchronization processing. In the case where three or more devices share data, there applies a restriction that data synchronization cannot be performed between two devices other than server. Therefore, for example, in the case where a personal computer connected to a network is used as a server, thereby causing two portable information processing terminals to include the duplicate data, even if an attempt is made to use duplicate data after updated in one portable information processing terminal by the other portable information processing terminal outside, data synchronization processing cannot be performed by these portable information processing terminals other than server. Stated another way, the conventional data synchronization processing is performed between the server and the client in a one-to-one manner. It is not possible to perform the data synchronization processing in a one-to-plural manner.

Furthermore, in general, it is required to provide communication settings for a data synchronization party, settings regarding type of synchronization data, or setting of a method of solving a problem during data conflict. These settings are conventionally provided by a user operating an input device of a personal computer or portable information processing terminal through the setting screen displayed on a display device of the personal computer or portable information processing terminal and inputting data. This means that at least the display device and input device of the portable terminal device are required. Therefore, in the conventional method, because of a restriction specific to device such as a wrist watch including device size, for example, it is very difficult to provide settings of data synchronization in a device having only a limited input device or display device.

BRIEF SUMMARY OF THE INVENTION

Accordingly, it is an object of the present invention to provide a communication method and electronic device that enables data synchronization between arbitrary devices without requiring a server.

According to the present invention, there is provided a communication method for synchronizing data between a plurality of arbitrary devices using a wireless or wired network, the communication method comprising a member registration step and a data synchronization step. In the member registration step, a device specified as a master by a user transmits to a device specified as a slave by the user a certificate indicating that the slave belongs to a data synchronization group that performs a data synchronization processing and a priority to be used when the slave performs the data synchronization processing, and then, the slave is registered as a member of the data synchronization group. In the data synchronization step, it is determined using the certificate whether or not one slave and one or more other slaves capable of making wireless or wired communication belong to the same data synchronization group, and the data synchronization processing is performed through wireless or wired communication in accordance with the priority between the slaves which are determined to belong to the same data synchronization group.

In this communication method, apart from the data synchronization step of actually processing data synchronization, the member registration step is provided for the purpose of specifying a target device for data synchronization. At this member registration step, the certificate and priority are transmitted from a device specified as the master to a device specified as the slave, whereby the slave can be registered as a member of the data synchronization group. The certificate and priority are provided to each member, whereby data synchronization can be easily performed between slaves even if the master is absent, as long as these devices are registered in the same data synchronization group.

In this case, as to whether or not the slaves capable of making wireless or wired communication belong to the same group, it is determined by exchanging the certificate between the slaves. Thus, even if a master does not exist, data synchronization can be performed reliably and safely between the slaves. In the case where a conflict occurs during data synchronization processing between slaves, such conflict can be solved by the priority assigned to each slave at the member registration step. Therefore, each slave may hold only the certificate and priority assigned to each slave itself, making it unnecessary to set data or the like concerning a communication party for data synchronization. Hence, a device having only its limited input device and display device can be used as a device targeted for synchronization. Further, as in a wired or wireless network such that a network configuration is dynamically changed, even in a case of use under environment that makes it difficult to provide data for statically specifying a communication party for data synchronization, a device that is such data synchronization party can be reliably specified.

The data synchronization step can be performed between one master and one or more arbitrary slaves having a certificate indicating that these slaves belong to the same group as well as between slaves.

In addition, there is no need to specify a master and a slave by devices, and an arbitrary device can be specified as a master or slave of the data synchronization group by data targeted for data synchronization. One device may function as a slave of the data synchronization group for one set of data or may function as a master of the data synchronization group for another set of data. Alternatively, one device may function as a slave of two data synchronization groups corresponding to two sets of different data.

In the case where a master and a slave are thus specified individually by data targeted for synchronization, the member registration step is also executed between a device specified as a master of a data synchronization group for the data targeted for data synchronization processing and a device specified as a slave of the master. Thus, for transmission of the certificate and priority as well, a master that is a transmission source and a slave that is a transmission destination are set by data, and the certificate and priority are set by data accordingly.

In addition to the aforementioned member registration step and data synchronization step, a master privilege transfer step may be provided, whereby only the master's function can be transferred to another device while the function and configuration of the current data synchronization group are maintained intact. Hence, a newly purchased device can be used as a master, and a slave can be temporarily used as a master outside.

In addition, it is preferable that a priority exchange step of exchanging a priority between slaves be further provided. In this manner, the priority registered in the member registration step can be changed later, and data synchronization processing can be achieved more flexibly between slaves.

The master privilege transfer step and priority exchange step as well are preferably performed after it has been determined that there does not exist any device other than two devices set in a mode for executing the above steps.

In order to easily change a member of the data synchronization group or the like, it is preferable to further provide a member registration releasing step of releasing a master or a slave from the data synchronization group. The slave releasing step may be performed by that slave device solely. However, the master releasing step is desirably executed together with the member registration releasing step of a slave communicable with the master. In this manner, a plurality of devices including a master can be released from the data synchronization group with one operation.

In addition, a conventional data synchronizing method assumes one-to-one cable connection, one-to-one connection with the server by modem, or one-to-one connection with the server by infrared-ray radiation. This is because a communication party for data synchronization can be uniquely specified.

However, if the data synchronization is performed in a bus type wired network or a wireless network free of directivity, unlike a case of one-to-one connection, it is required to uniquely identify a party for data synchronization from the devices in a network by any method. In addition, in the case of a wireless or wired network such that a network configuration is dynamically changed, the network address of each device is not fixed, and a network address is often assigned during network connection or the like. Thus, the network address of a communication party cannot be used as static identification information for specifying a communication party for data synchronization. Therefore, in a wire or wireless network such that a configuration is dynamically changed as well, it is required to introduce a new technology for making it possible to uniquely identify a party for data synchronization.

Although it is not presumed in one-to-one connection, in a bus type wired network or a wireless network free of directivity, there is a possibility that a device other than device for data synchronization, for example, a malicious third party exists in the same network, especially in a wireless network. Thus, it is required to ensure data security, and at the same time, to prevent data leak due to computer hacking or the like. In particular, in a wireless network, there is high possibility that a device is merely disposed within the reach of wireless communication, whereby the device can be easily participated in the network. Thus, data security is important. In addition, without maliciousness, there is a danger that data contained in a device other than that targeted for synchronization, the device existing within the reach of wireless communication, is mistakenly or unintentionally changed by data synchronization processing between devices via wireless communication.

According to the present invention, such an undesired data synchronization is prevented from being occurred since the party for data synchronization can be easily identified by exchanging the certificate between the devices.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 1 is a view illustrating a member registration step and a data synchronization step that are employed in a communication method according to one embodiment of the present invention;

FIG. 8 is a view showing an example of communication mode during certificate data exchange and synchronizing process in the present embodiment;

FIG. 9 is a view showing another example of communication mode during certificate data exchange and synchronizing process in the present embodiment;

FIG. 10 is a view showing an example of processing at the time of data conflict in the present embodiment;

DETAILED DESCRIPTION OF THE INVENTION

Figures 2, 3:
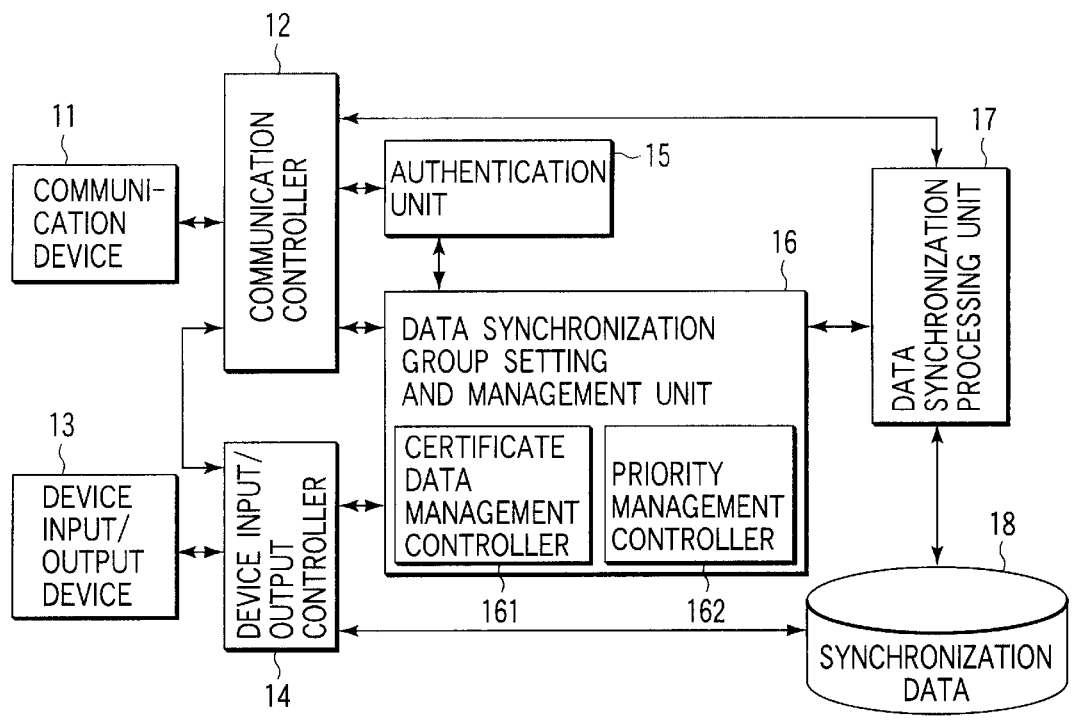
FIG. 2 is a view showing an example of data set of each device employed according to the present embodiment.
FIG. 3 is a block diagram depicting the configuration of each device employed according to the present embodiment.

A preferred embodiment of a communication method for data synchronization processing according to the present invention will now be described with reference to the accompanying drawings.
First Embodiment Hereinafter, an embodiment of a method and apparatus for synchronously processing data according to the present invention will be described with reference to the accompanying drawings.

Data Synchronization Group

Data synchronization denotes processing for, in the case where part of duplicated data is asynchronously updated independently relevant to plural sets of the duplicated data, entirely synchronizing the plural sets of these duplicated data. For example, assume that a set of data (data set) that a device A has is duplicated in a device B. Synchronization processing corresponds to processing for synchronizing data sets of the devices A and B each other. If a partial data field of the data set that the device A has is changed, a partial data field of the data set that the device B has is updated during next synchronization processing.

If the same data field of the data sets of the devices A and B is changed during and after the previous synchronization processing, in order to synchronize these data fields, it is required to select which of the data field values has a higher priority. When the data in the same data field is changed with a plurality of devices during or after synchronization processing, it is referred to as data conflict.

In the present invention, unlike a conventional method, data synchronization processing between information devices is not performed by one-to-one processing between a server and a client. This processing is performed based on a data synchronization group constructed exclusively for synchronization processing. Of the information devices capable of making data communication wirelessly or using a wire, a group configured between devices that performs data synchronization is referred to as a data synchronization group (or network). Namely, a data synchronization group composed of devices that should perform data synchronization processing corresponds to a data synchronization group. In this case, such data synchronization group may not be always configured by devices, and an arbitrary data synchronization group can be configured by each data set that enables data synchronization. Namely, each information device can configure the data synchronization group by the number of data sets that can be managed.

In addition, information devices may be a device employed for limited use such as wrist watch or may be a device having a plurality of functions such as personal computer. These information devices are not restricted by their sizes or the types or functions of input/output devices or display devices and the like. The data synchronization group is configured by a plurality of information devices. A device configuring one data synchronization group is referred to as a member of the data synchronization group.

A data synchronization group is a permanent concept. Data synchronization processing is performed by a member of the data synchronization group that is configured in advance, unlike a case in which a data synchronization group is configured every time data synchronization processing is performed.

Data Synchronization Group Communication

A communication method in a data synchronization group comprises a member registration step and a data synchronization step. FIG. 1 shows an example.

The member registration step is a step to be performed when a member is added to a data synchronization group. At this member registration step, a certificate and a priority are transmitted from a device specified as a master by a user to a device that the user want to newly register as a slave. The certificate indicates that a device receiving it belongs to the same data synchronization group (data synchronization network) as the master. That is, the certificate corresponds to a group ID or the like. The priority is used when a device receiving it performs data synchronization processing, and is employed to solve data conflict.

The data synchronization step is a step that performs data synchronization processing between a plurality of arbitrary members configuring a data synchronous group.

In FIG. 1, M denotes a master of a data synchronization group. The master M is a core of the data synchronization group. Only one master exist in one data synchronization group, and has a privilege of adding a member to the data synchronization group. $S_1$ to $S_4$ denote slaves of the data synchronization-group. One or more slaves exist in one data synchronization group. Data synchronization member registration is performed between the slave and the master M in the data synchronization group, whereby the slave becomes a member of the data synchronization group.

A master and a slave may not be always specified by devices, and an arbitrary device can be specified as a master or slave of the data synchronization group corresponding to the data sets. Thus, one device may function as a slave of the data synchronization group relevant to one set of data or may function as a master of the data synchronization group relevant to another set of data. Alternatively, one device may function as each of the slaves of the two data synchronization groups corresponding to two different types of data.

Member Registration Step

The member registration step is executed by making one-to-one communication between a device that is a master of a data synchronization group and a slave that newly participates in the data synchronization group. Two members configure the data synchronization group at a stage at which a first slave $S_1$ is registered in the master M. Subsequently, the member registration step is sequentially performed similarly between the master M and each of the slaves $S_2$ to $S_4$ to be newly registered, whereby the number of members configuring the data synchronization group increases one by one. The member registration step is not performed every data synchronization. Once a device is registered as the member, such registered device is continuously a member of the data synchronization group unless the device has been released explicitly. Data synchronization processing can be executed any time between the members in the same data synchronization group.

Data Synchronization Step

At the data synchronization step, data is synchronized between the members that belong to a data synchronization group. Here, all the members may perform data synchronization processing at one time or arbitrary members may perform data synchronization processing. In addition, the master M may be or may not be participated in data synchronization processing. According to the present invention, data synchronization processing can be performed between slaves. A plurality of synchronizing processes configured by other members can be performed independently at an arbitrary time, and a plurality of these synchronizing processes may be performed simultaneously in another place.

For example, as shown in FIG. 1, in the case where only the master M and the slave $S_1$ configure a data synchronization group, the data synchronization step is executed between these two devices, namely between the master M and the slave $S_1$. Alternatively, in a state in which a slave $S_2$ is newly registered, the data synchronization step can be executed between the master M and slave $S_1$, between the master M and slave $S_2$, between the slave $S_1$ and the slave $S_2$, or between the master M and the slaves $S_1$ and $S_2$. Hereinafter, the synchronization step is executed similarly between arbitrary two devices irrespective of the master or slave.

Member Configuration

Now, the data and functional structures set to each of the master and slave devices will be described with reference to FIG. 2 and FIG. 3.

Set data for setting the data synchronization group that each device stores, includes master/slave specification data, identification data, certificate data, priority data, and a counter value.

The master/slave specification data is like a flag, and its initial value is blanked. When a device is registered as a master or slave, the corresponding flag is set.

The identification data denotes data for uniquely specifying a member in one data synchronization group, and is used as a key for generating certificate data. The synchronization group is defined by data type, and thus, the identification data differs depending on type of data set in one device. The identification data is generated in each device when one device is registered as a slave of a data synchronization group or when a device is operated as a master by a master declaration described later.

The certificate data corresponds to the aforementioned certificate, and is employed to certify that one device belongs to one data synchronization group.

For example, during data synchronization assume that it is authenticated by a public key encryption system as to whether or not devices belong to the same data synchronization group and encryption of synchronization data after authenticated. The identification data and the certificate data are employed as follows in an authentication and encryption system.

First, each of the master and slave generates a secret key and a public key. A pair of these secret key and public key corresponds to the identification data of each device. When the identification data is transmitted to another device, only the public key that is part of the identification data is transmitted. During data synchronization group registration, when a slave passes a public key as the identification data to a master, the master returns this public key of the slave as a certificate after the public key has been encrypted by own secret key. In this manner, the slave has own secret key and public key; and a certificate certified by the master and the public key of the master. Here, this certificate and the public key of the master are referred to as certificate data.

During actual authentication and encryption, when a device performing authentication receives a certificate from the counterpart, this certificate is decrypted by own public key of the master. If the certificate is correctly decrypted, it means that the device of the counterpart belongs to the same data synchronization group. Then, the public key of the counterpart is extracted from the decrypted data, and the synchronization data is encrypted by the extracted public key of the counterpart, and is transmitted, whereby synchronization data can be transmitted safely.

The certificate data may certify reliably that each device belongs to a data synchronization group. The data may be generated by other well known various methods without being limited to the aforementioned method.

The priority data is used to solve conflict of data synchronization as described previously. The data is used to determine a precedence (namely, priority) for solving such data conflict.

The counter value is data used to count the number of slaves registered by the master and determine the priority of that slave. The highest priority of the master is "1". The counter value is counted up every time a slave is registered, and the priorities "2", "1", . . . are assigned to the slaves in order of registration. This counter is used by the master only.

As described above, the data synchronization group is configured by each data set. Thus, the master/slave specification data, certificate data, identification data, priority data, and counter value are provided and managed by each data set. That is, in a device having a plurality of data sets, the certificate data, identification data, priority data, and counter value are not managed in one-dimensional manner, and are managed in two-dimensional manner, namely, by each data set, as shown in FIG. 2. FIG. 2 shows an example when a device belongs to three data synchronization groups corresponding to three types of data sets, i.e., "address directory", "time", and "E-mail", respectively. In this case, in a device having these three types of data sets, whether the device operates as a master or slave by each data set is managed. The counter value is valid only for a data set of the data synchronization group that operates a master. In addition, the aforementioned member registration step is performed by data synchronization group, the certificate data, identification data, priority data, and counter value are independent of each other by each data set, respectively. The secret key and public key configuring identification data are generated by the member registration step by employing random numbers, for example. The value of the identification data is continuously maintained until it has been removed from the data synchronization group in which a device is registered as a member at the member registration step.

In this manner, in the case where set data on a data synchronization group is managed by each data set, when one performs each of the functions including data synchronization member registration, data synchronization processing, master declaration, data synchronization member releasing, master privilege transfer, and priority exchange, a step is executed such that a user can select a target data set from among the data sets in the row direction shown in FIG. 2 in order to specify what is a data set targeted for processing.

FIG. 3 shows the functional configuration of each device. This network configuration is provided as an example when a device can be configured as a master and a slave.

As shown in FIG. 3, each device includes a communication device 11, a communication controller 12, a device input/output device 13, a device input/output controller 14, an authentication unit 15, a data synchronization group setting and management unit 16, a data synchronization processing unit 17, and a synchronous data storage device 18.

The communication device 11 makes communication with another device via a wireless or wired communication. This device 11 transmits data to another device, and receives data from such another device. As a wireless communication, there can be used an electric wave communication, free of directivity such as "Bluetooth", for example. In addition, a bus type LAN such as "Ethernet" can be used as a wired network. In either of the wireless and wired communication, the network configuration may not be statically determined. The present invention is applicable to a network such that the network configuration is dynamically changed.

The communication controller 12 controls data reception and/or transmission. The controller 12 includes a function for checking data and a request received by the communication device 11; a function for transmitting and receiving a processing request and response from the device input/output controller 14; a function for making a data transmission and reception request for the communication device 11; and a function for transmitting and receiving a request and a response among the authentication unit 15, data synchronization group setting and management unit 16, and data synchronization processing unit 17, respectively.

The device input/output device 13 is a user interface, and is an input device or a display device of own device.

The device input/output controller 14 controls data request and transmission and/or reception relevant to the device input/output device 13. The controller 14 includes a function for checking data and a request received by the device input/output device 13; a function for making a processing request for the communication controller 12; a function for receiving the processing request from the communication controller 12; a management function for writing, reading, deleting data relevant to the synchronization data storage device 18; and a function making a request for and a response to the data synchronization group setting and management unit 16.

The authentication unit 15 authenticates certificate data received from another device in response to an authentication request from the communication controller 12 by correlating the data with certificate data of the own device, the data being owned by a certificate data management controller 161 through the data synchronization group setting and management unit 16. The unit 15 determines whether or not another device belongs to its data synchronization group, i.e., whether or not both of the own and other devices belong to the same data synchronization group.

The data synchronization group setting and management unit 16 generally manages settings of the data synchronization group. The unit 16 includes a certificate data management controller 161 and a priority management controller 162. The data synchronization group setting and management unit 16 manages own settings by using the certificate data management controller 161 and the priority management controller 162. The unit 16 transfers data or a processing request to the communication controller 12, authentication unit 15, device input/output controller 14, data synchronization processing unit 17, priority management controller 162, and certificate data management controller 161.

The certificate data management controller 161 has a region for storing certificate data certified by a master of the own device and a region for storing identification data that is a source of the certificate data. The controller 161 manages certificate data and identification data for generating such certificate data. The controller 161 includes functions for generating, deleting, and setting the certificate data and the identification that is a source of the certificate data according to a request from the data synchronization group setting and management unit 16.

The priority management controller 162 has a region for storing priority data on own device; a region for storing a counter value changed when a priority is issued in a master; and a counter device. The controller 162 includes a function for processing requests for generating, setting, deleting, and transferring priority data from the data synchronization group setting and management unit 16; and a function for resetting and incrementing the counter device.

The data synchronization controller 17 performs synchronization processing for a data set targeted for synchronization (synchronization data). The controller 17 includes a function for reading, writing, and deleting data relevant to the synchronization data storage device 18; a function for solving data conflict in view of the priority of own device and that of another synchronization device; and a function for processing a request from the communication controller 12 and delivering data.

The synchronization data storage device 18 stores synchronization data, and has a region for storing data.

The configuration of this device is provided as an example when a device can be configured as a master and a slave. This configuration may include a device (member) that can be configured as a slave only or a device (member) that can be configured as a master only. In this case, there can be provided a configuration in which functions or configurations required for a slave and a master are eliminated. For example, a certificate data producing function and a counter device and its control function and the like may be provided to only a device that can operate as a master, and is not required for a device that functions as a slave only.

Now, data synchronization group management and operation will be described here.

Figure 4:
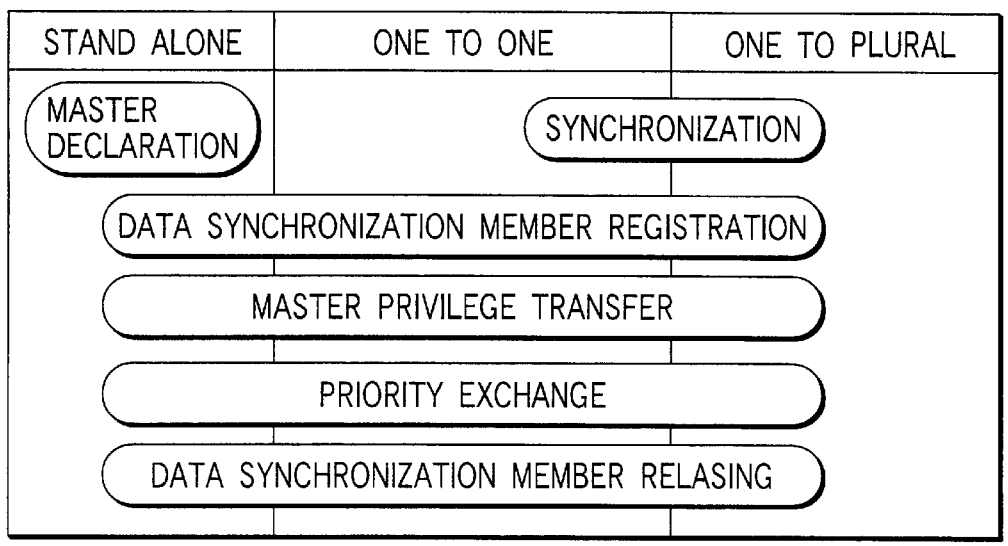
FIG. 4 is a view showing an example when functions provided to each device employed according to the present embodiment are classified by communication mode.

First, all functions owned by each device in a data synchronization group will be described with reference to FIG. 4.

A device that can configure a data synchronization group includes a total of six functions. The device includes a function to be processed without making communication with another device; a function requiring one-to-one communication between one device and another device; and a function requiring communication between one device to a plurality of devices (actually, made of a plurality of one-to-one communications). The "master declaration" function is a stand alone function that is processed without making communication with another device. The "data synchronization member registration", "master privilege transfer", and "priority exchange", functions are processed through one-to-one communication. The "data synchronization" function is performed between two or more devices. The "data synchronization member releasing" function is a stand along function in a slave, and a function that is processed through communication with one or more slaves in a master. Hereinafter, these functions will be described in detail. These functions can be performed by data synchronization group. When a function is read, it is required to specify an identification code of the data synchronization group.

(1) Data Synchronization Member Registration

In the case where a new member is added to a data synchronization group, "data synchronization member registration" processing is performed. This processing is adopted to achieve the aforementioned member registration step. The processing is performed by making data communication between a master of a data synchronization group and a member to be newly added as a slave. The master and newly registered member must be communicable with each other via a wireless or wired communication channel while power is supplied. The user calls the "data synchronization member registration" function each in the master and the member to be registered. Subsequently, each of the master and the member to be registered is placed in a member registration mode. In order to enter the member registration mode, the user interaction and exclusive control for another device are used such that the user holds down the registration button in each of the master and the new member, for example, and registration is permitted only when only two devices in the member registration mode exist, and security authentication during registration is provided. It is possible to determine whether or not only two devices in the member registration mode exist by checking a response to a broadcast from the master, for example. This prevents accidental registration of a device owned by a malicious third party within the reach of electric waves.

The effective communication range means that a device is within the reach of wireless communication in a wireless network. In a wired network, this range means a limited network area such as sub-network, for example, in which broadcasting is effective. Namely, in the range which has a possibility that a third party receives the communication, under the condition that there exists any device other than only two devices, i.e., a device targeted for member registration and a master, which are set in the member registration mode, data synchronization member registration is started.

Figure 5:
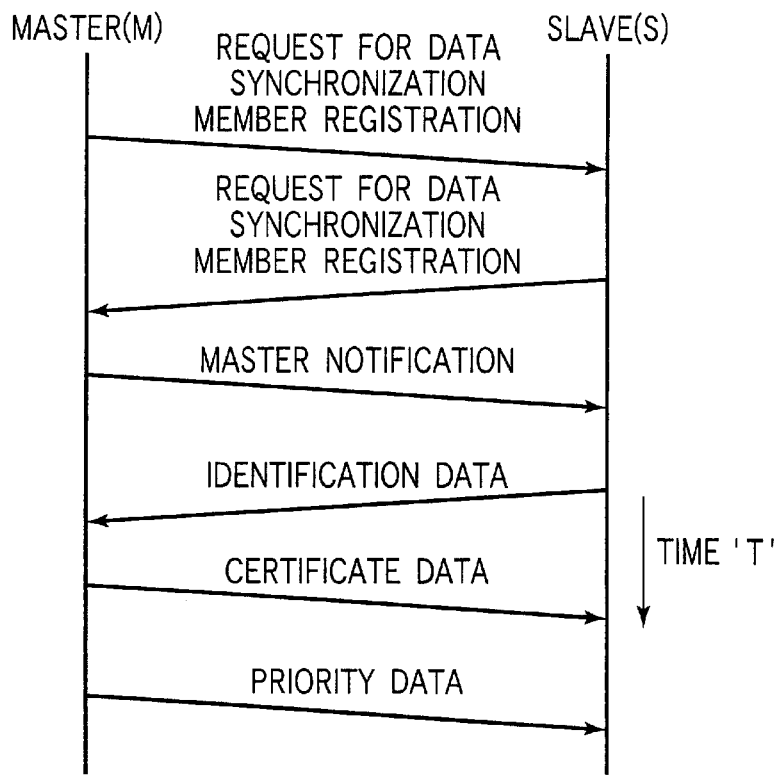
FIG. 5 is a view showing master and slave data exchange during data synchronization member registration according to the present embodiment.

Next, a function for registering a data synchronization member will be described in detail. In FIG. 5, there is shown master and slave communication processing to be performed together with synchronization member registration.

First, both of the master M and the slave S transmit to the counterpart a request for registering a data synchronization member, and then, the master notifies its identity to the slave. In this state, the master has all set data, but the slave has only identification data. When the slave receives the notification, it transmits the identification data to the master. The master transmits to the slave the certificate data for this slave generated using the identification data and the priority data, and communication processing is completed.

Figure 6:
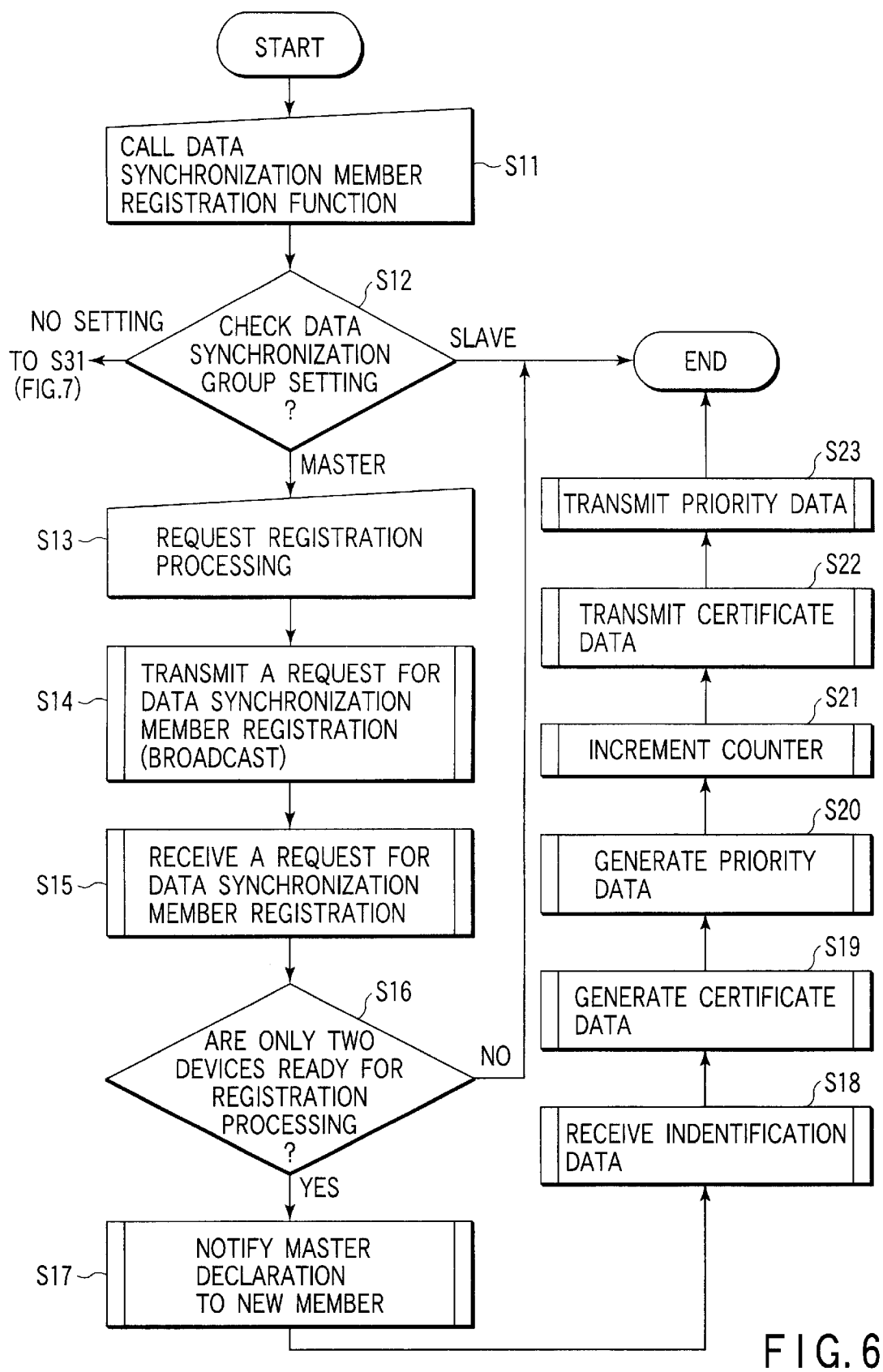
FIG. 6 is a flow chart showing procedures for master processing during data synchronization member registration according to the present embodiment.

Now, the processing step in each device will be described in detail. In FIG. 6, there is shown the step of master processing when a master device registers a slave device as a member of the data synchronization group. A description is given with reference to FIG. 3.

Figure 7:
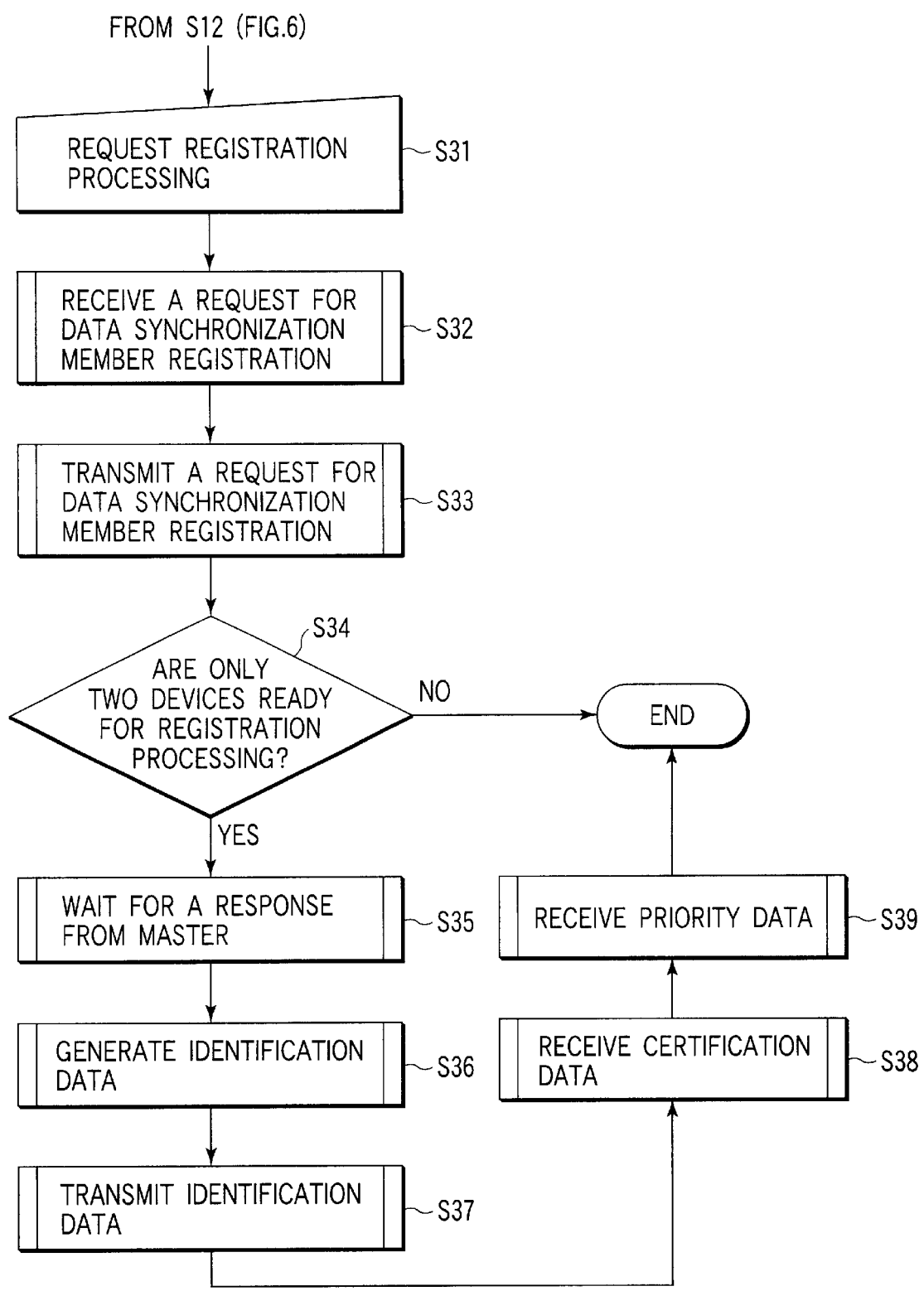
FIG. 7 is a flow chart showing procedures for slave processing during data synchronization member registration according to the present embodiment.

First, when a user call of the "data synchronization member registration" function is transmitted to the device input/output controller 14 (step S11), the current setting of the data synchronization group (whether the own device is a master or slave) is determined at the data synchronization group setting and management unit 16 (step S12). If the own device is set as a master by a master declaration function described later, the user is prompted for a request for executing registration processing. When it is set as a slave, processing is terminated. In the case where nothing is set (i.e., blank data is specified), the device operates as a newly registered member described later (FIG. 7).

In the case where the own device is set as a master, when the device input/output device 13 receives a request for executing registration processing from the user (step S13), the communication device 11 transmits a request for registering a data synchronization member in a broadcasting manner (step S14). Then, the communication device 11 waits for a registration request from a new member. Although not shown, in the case where a registration request is not made for a predetermined time, processing terminates with time out. When a registration request from a new member is received (step S15), the registered device determines whether or not only two devices requires the registration, i.e., the own device and a new member (step S16). Namely, after a request for registering a data synchronization member has been transmitted between the own device and the counterpart, if only one counterpart transmits such request for registering a data synchronization member, it is determined that only two device, i.e., the own device and new member participate the registration.

In the case where any device other than only two devices, i.e., the own device and new member participate the registration (NO at the step S16), processing is terminated. In the case where only two devices participate the registration (YES at step S16), the communication device 11 notifies its identity to the new member (step S17). Then, when identification data that is a source of certificate data from the new member is received by the communication device 11 (step S18), the data synchronization group setting and management unit 16 generates the certificate data and the priority data to be passed to the new member, based on this data (steps S19 and S20). Further, the value of the counter that counts the number of registered devices is incremented by one (step S21).

Last, the communication device 11 transmits the generated certificate data and the priority data to the new member (steps S22 and S23). Although the counter value is used as the priority data, the priority may be determined in any system as long as a precedence can be defined by generating different values every issue, thereby making it possible to uniquely judge the priority among these generated values.

Now, in FIG. 7, there is shown the step of processing a new member when a desired device (member) newly participating in a data synchronization group is registered as a data synchronization group member by a master device. A description will be described with reference to FIG. 3.

When the device input/output device 13 receives the user request for "data synchronization member registration", as in the case with FIG. 6, the current data synchronization group setting is determined by the data synchronization group setting and management unit 16. In the case where the own device is set as a master, the aforementioned "data synchronization member registration" (FIG. 6) is performed. In the case where the own device is set as a slave, processing terminates. If a data synchronization group is not set (blank data is specified as a master or slave), the user is prompted for request for executing registration processing. When the user makes a request for executing registration processing to the device input/output device 13 (step S31), the communication device 11 receives a registration request from the master (step S32), and transmits such registration request to the master (step S33). Although not shown, in the case where there exists no response from the master within a predetermined period of time, processing terminates with time out. After the registration request has been transmitted to the master, the registered device determines whether or not only two devices, i.e., the own device and master participate the registration (step S34). In the case where only the two devices participate the registration, the own device waits for the counterpart master notification. In this manner, it is determined that the counterpart is a master (step S35), the data synchronization setting and management unit 16 generates identification data that is a source of the certificate data (step S36), and transmits the data to the master (step S37).

When the communication device 11 waits for the certificate data and priority data from the master, and receives them, the certificate data and priority data are set through the data synchronization group setting and management unit 16, and registration processing completes (steps S38 and S39).

In registration processing of a data synchronization member, it is required to share a data set of the same type between the master issuing the certificate data and priority and the new member to be registered. In the case where an attempt is made to register data sets of their different types, it is required to disable registration. This collation step can be performed by checking whether or not identifiers 01, 02, and 03 are assigned in advance to an address directory, a time, and schedule, for example, during "transmission of a request for registering a data synchronization member" (step S14) and during "transmission of a request for registering a data synchronization member" (step S33), transmitting these identifiers between the master and the new member, and checking whether or not the identifiers are identical to each other.

Once it is guaranteed that a master and a slave that belong to a data synchronization group and a slave have a data set of the same type, it is authenticated as to whether or not the master and the slave belong to the same data synchronization group when another function is used. Thus, there is no possibility that data sets of the different types coexist. Even in a device having a plurality of data sets, the data sets in that device configure, respectively, other completely independent data synchronization groups, the data sets of different types and processing do not coexist.

(2) Data Synchronization Processing

Now, data synchronization processing will be described here.

When a master in a data synchronization group transmits certificate data and priority data to each member by data synchronization member registration processing, actual data synchronization processing can be performed between arbitrary members (even without intervening a master) by using at least these two sets of data.

During synchronization processing, the members belonging to the same data synchronization group first authenticate their identities each other, and then, perform data synchronization. Sets of data that do not conflict with each other are merged, respectively. In the case where a conflict occurs with some sets of data, the data with the highest priority is employed as data for solving a conflict.

As shown in FIG. 8, assume that a data synchronization group is configured by five members A, B, C, D, and E, wherein the member A is a master.

In the case where data synchronization processing is performed when all the members are present, one member transmits own certificate data to another member, receives certificate data from the counterpart, and authenticates their identity with each other. In transmission and authentication of certificate data, there is provided a method for all members transmitting/receiving certificate data to/from all the counterparts, thereby individual members using their received certificate data to authenticate their identities. Namely, among the members A to E, certificate data transmission/reception and authentication may be performed according to the number of combinations of different two members.

Alternatively, as shown in FIG. 9, certificate data transmission/reception and authentication may be performed only between a member with the highest priority (the member A here) and another member. Namely, there is provided a method in which the pairs of members such as A and B, A and C, and A and D, and A and E (the member A serves as a server), thereby performing authentication. After each of the members A to E has been authenticated to be a member of the same data synchronization group, in actual data synchronization processing, a member with the highest priority (the member A here) transmits/receives synchronization data in a data field to/from all other members, checks a conflict, solves such conflict based on the priority, and changes data so that the member can sequentially process the synchronization data in the next data field.

A conflict during data synchronization processing occurs, as shown in FIG. 10, in the case where the members A, C, and E have not been changed relevant to a data field 'x' but data owned by the members B and D is updated since previous synchronization processing. Means for solving such data conflict is to employ data owned by the member B with the highest priority. This is because, although the member A has the highest priority of the five, data is changed in the members B and D only. Even if data is not changed, a conflict during synchronization processing may be solved using the data owned by the member A with the highest priority.

Next, assume that only the members A, B, and C in this data synchronization group perform data synchronization. Such situation can occur when the members D and E are not turned ON or when only the members A, B, and C are carried to the outside, and data synchronization is performed outside. Authentication and data synchronization are performed in the same manner as described above. Then, assume that data owned by the members B and C conflict with each other (that is, assume that the data in the same data field owned by the members B and C has been updated during and after the previous synchronization). Such conflict is solved by using the data of a member having the highest priority of the members B and C. As a result, the data owned by the members A, B, and C are synchronized with each other. Assume that the remaining members D and E performs data synchronization in another place. As is the case with the members A, B, and C, if a conflict occurs, such conflict is solved by using the data with the highest priority of the members D and E, and the members D and E undergoes data synchronization.

As described above, data synchronization processing can be performed between slaves as well as between one master and one or more arbitrary slaves, each of which has a certificate indicating that they belong to the same data synchronization group that performs data synchronization processing. In this case as well, certificate data is transmitted between devices capable of making wireless or wired communication, whereby it is determined that these devices belong to the same data synchronization group. Thus, data synchronization can be performed safely by using only the certificate data without having specific data for uniquely specifying the counterpart.

Data synchronization processing can be performed as follows, for example.
(a) A device set in a data synchronization processing mode transmits a data synchronization processing request in a broadcasting manner to other devices that exist within a communicable range;
(b) A certificate is transmitted between these devices, and it is authenticated as to whether or not they belong to the same data synchronization group each other; and
(c) When the above devices belong to the same data synchronization group, data synchronization of the corresponding data sets is executed in accordance with each priority.

In the case of data synchronization processing, unlike registration processing of a data synchronization member as described in FIG. 6 and FIG. 7, there does not apply a restriction that only two devices, i.e., a master and a member targeted for new registration. Data synchronization processing can be performed between two or more arbitrary devices that exist within a communicable range provided they belong to the same data synchronization group. All the devices to be synchronized may be set in a data synchronization processing mode; only one device may be set in a data synchronization processing mode by the user, and another device receiving a data synchronization processing request from that device may automatically enter the data synchronization processing mode according to that request.

In addition, in actual data synchronization processing, the user may specify a data set targeted for data synchronization processing in the data sets for which data synchronization groups are set. Alternatively, it is determined as to whether devices belong to the same data synchronization group relevant to all the data sets for which the data synchronization groups are set, whereby these synchronizing processes are executed simultaneously relevant to the data sets which belong to the same data synchronization group. Authentication data exists by each data set for which the data synchronization group is set. Thus, all the authentication data is exchanged each other, for example, thereby making it possible to check a data synchronization group to which both of the counterpart device and the own device belong. Of course, the identifier assigned to each data set is transmitted, whereby a data synchronization group to be authenticated may be specified.

(3) Master Declaration

Now, a "master declaration" function for setting the own device as a master of a data synchronization group will be described here.

In the case where a data synchronization group is newly constructed, it is required to determine a member as a master of the network. The "master declaration" function is provided to achieve this. The "master declaration" can provide setting such that only a member having a data set, which does not belong to any data synchronization group, can be a master of a data synchronization group that the member will construct. That is, a device that has already been set as a slave cannot be changed to a master. This setting is provided by a stand alone, and communication with another member is not performed.

In the existing data synchronization group, the "master declaration" cannot be performed by changing to a master a member that does not belong to the data synchronization group or a member that has been set as a slave or temporarily executing "data synchronization member releasing" for a slave to remove the slave from the data synchronization group, thereafter adding it as a master again. This is required to ensure security. In the latter case, there is defined another new data synchronization group in which a member performing "master declaration" is set as a master. The "master declaration" is used any time only when a new data synchronization group is constructed.

Figure 11:
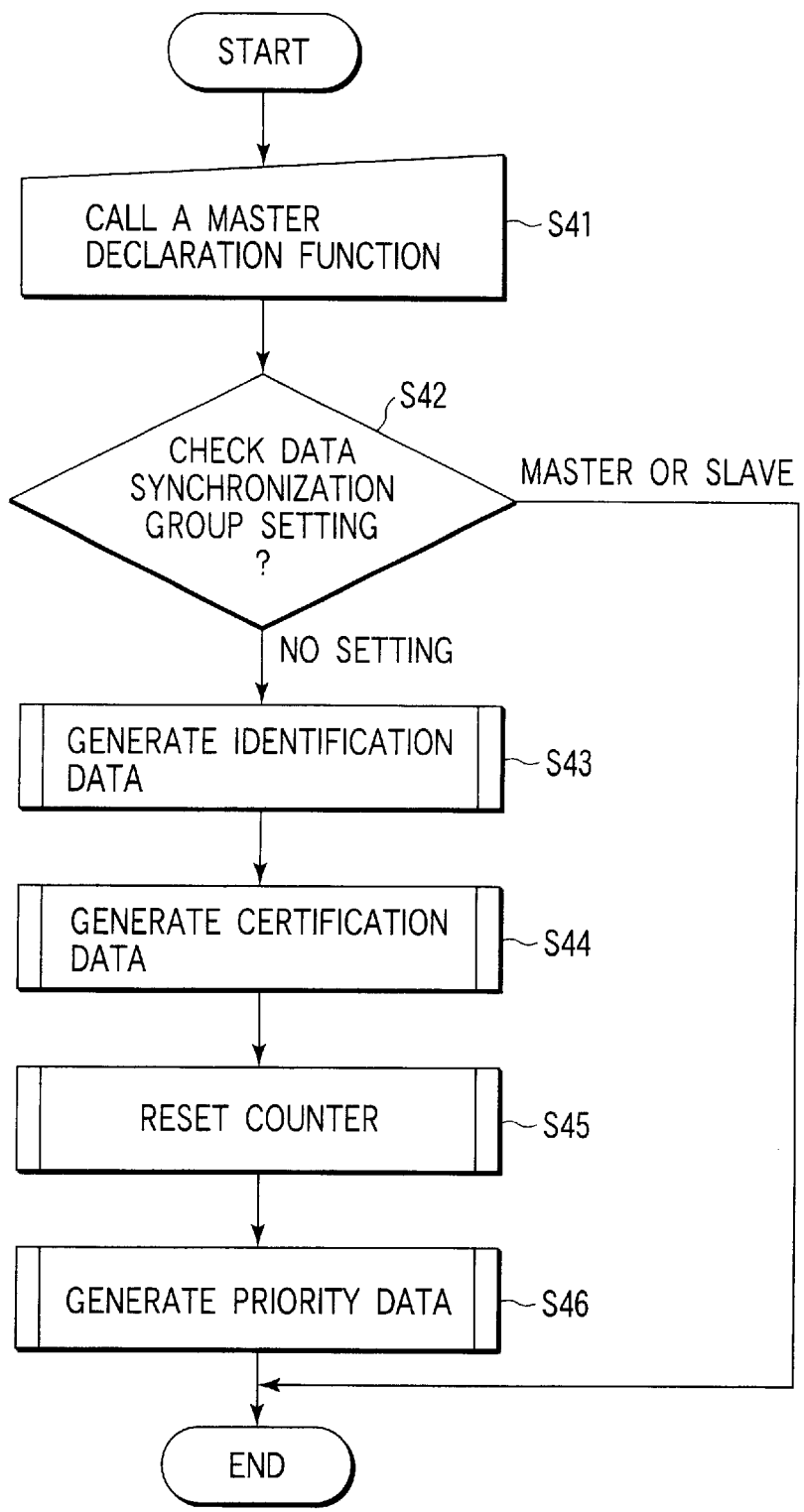
FIG. 11 is a flow chart showing procedures for master declaration processing in the present embodiment.

In FIG. 11, there is shown the processing step of "master declaration" in which a new member is set as a master of a new data synchronization group by the "master declaration".

When the user first makes an operation for calling the "master declaration" function for a data set through the device input/output device 13 (step S41), the data synchronization group setting and management unit 16 checks the current setting of the own device in the data synchronization group (step S42). In the case where the device has been set as a master or slave, processing is terminated. If no data synchronization group is defined (i.e., if blank data is specified as a master or slave), the data synchronization group setting and management unit 16 generates identification data on a data synchronization group (step S43), and generates authentication data based on the generated identification data (step S44).

Further, in the data synchronization group setting and management unit 16, a priority counter is reset, and the initial value of the counter is set as priority data indicative of own priority (steps S45 and S46). Then, the counter is incremented, and processing is terminated.

(4) Data Synchronization Member Releasing

"Data synchronization member releasing" is performed when a registered device is released from a data synchronization group. This operation differs depending on a master and a slave, and thus, a description will be given separately.

First, a description will be given with respect to a case in which a slave is released from a data synchronization group. This function is used when a slave participating in a data synchronization group is used while the slave is excluded from the member of the synchronization group or when a slave device is discarded. The "data synchronization member releasing" is a stand-alone operation, and communication with a master or another device is not required. The existing data synchronization group is not affected by this function. The priority data owned by the released slave will be vacant because it is not reused in "data synchronization member registration". However, this does not mean that consistency of the data synchronization group is not destroyed.

Figure 12:
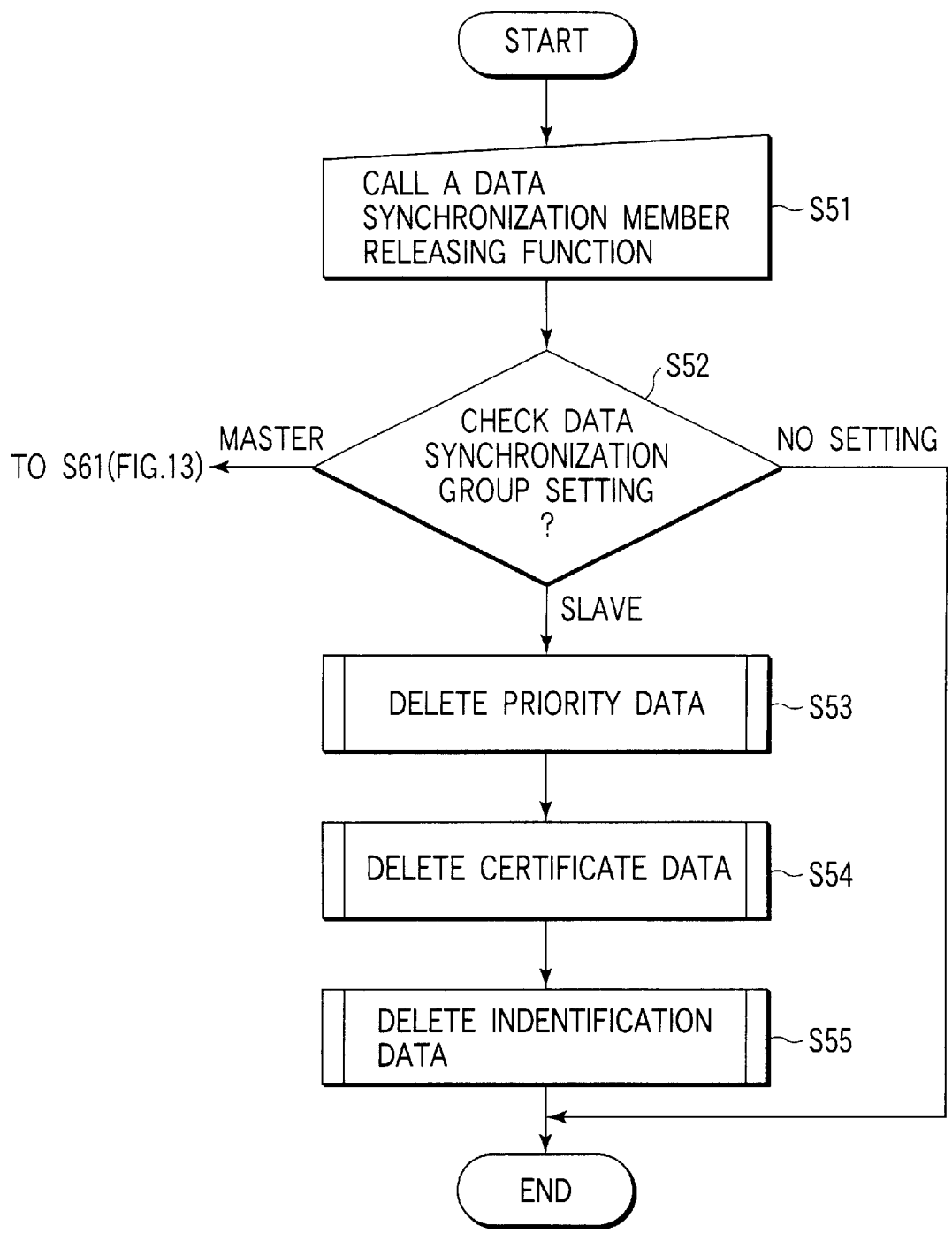
FIG. 12 is a flow chart showing procedures for slave processing in data synchronization member release processing according to the present embodiment.

In FIG. 12, there is shown the processing step when "data synchronization member releasing" is performed in a slave.

First, when a user make a request for "data synchronization member releasing" for the device input/output device 13 relevant to a data set (step S51), the data synchronization group setting and management unit 16 determines the current setting of the own device in the data synchronization group (step S52). When the own device is a slave, the data synchronization group setting and management unit 16 deletes the corresponding priority data, certificate data, and identification data (steps S53, S54, and S55). This releasing is performed by each synchronization group, and thus, network identification data is also specified when the releasing function is called.

In the case where a master is released from a data synchronization group, if a slave currently communicable with the master exists when "data synchronization member releasing" is performed, this slave is also released from the data synchronization group. This is because the master generally dismembers a slave without transferring its master privilege when the master desired to release the slave from the data synchronization group. In addition, only a communicable slave is released from the data synchronization group simultaneously because it is not assumed that all members in the data synchronization group are always present by the fact that the master cannot grasp all the members in the data synchronization group and the fact the slave is placed in another place due to purchase of a new device, discarding, faults, theft or the like. In this case, a slave that does not exist on the spot still participates in the previous data synchronization group, and data synchronization can be performed between the slaves that do not exist on the spot. However, in this case, since a master does not exist any longer, a data 64 synchronization group member cannot be increased by newly performing data synchronization member registration.

Figure 13:
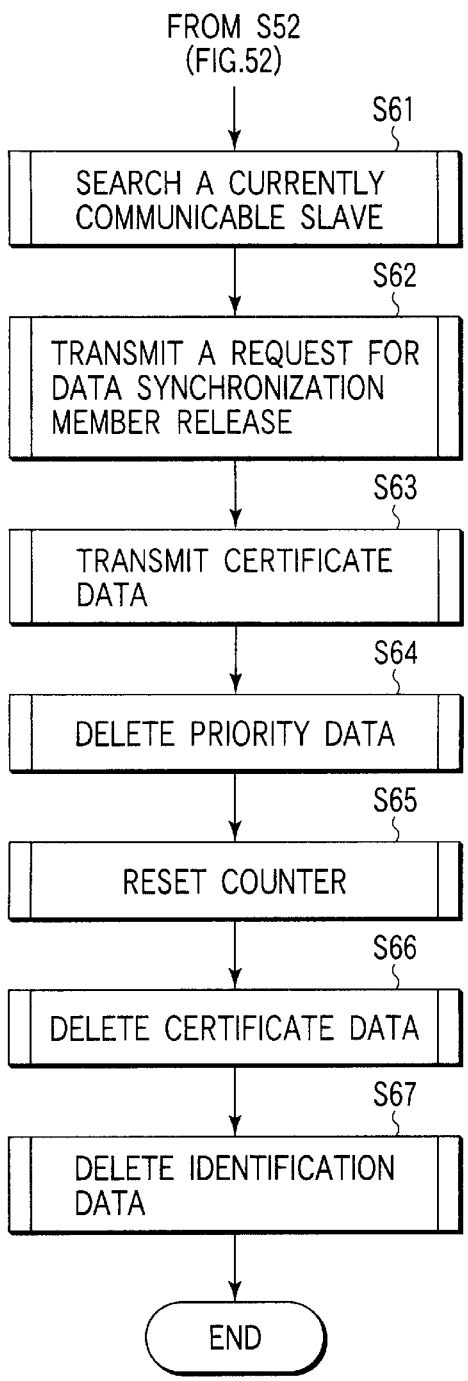
FIG. 13 is a flow chart showing procedures for master processing in data synchronization member release processing according to the present embodiment.

In FIG. 13, there is shown the processing step when "data synchronization member releasing" is performed in a master. When a user makes a request for "data synchronization member releasing" relevant to a data set to the device input/output device 13, as described in FIG. 12, the data synchronization group setting and management unit 16 determines the current data synchronization group. In the case where the own device is a master, this device searches for a currently communicable slave (step S61). This may be determined according to a response from the slave relevant to data transmitted in a broadcasting manner. Then, the own device transmits a request for "data synchronization member releasing" and the master certificate data to a slave within the currently communicable range (steps S62 and S63).

The slave receiving this request performs authentication by using the master certificate data, and then, resets own setting as in "data synchronization member releasing" in the slave.

The master is then deletes the priority data, certificate data, identification data, and counter values of the own device, the counter is reset, and processing is terminated (steps S64 to S67).

(5) Master Privilege Transfer

The "master privilege transfer" function allows a data synchronization group to continuously exist intact in the existing data synchronization group, and allows the current master to transfer only the master's privilege to another member (slave). This function is used when one attempt to transfer a master privilege to another device while maintaining the functions and configuration of the data synchronization group, including cases in which where one attempts to specify a newly purchased device as a master of the existing data synchronization group; a master device is discharged; one attempts to change the current master device to a new device; and, when a desk top personal computer that is not mobile is specified as a master, one attempt to temporarily perform "data synchronization member registration" outside. This means that the slave and master privileges are exchanged in the existing data synchronization group. Alternatively, the master privilege may be transferred to a member that is not included in a data synchronization group by automatically exchange the privileges in combination with "data synchronization member registration".

In this process, the "master privilege transfer" function is called by a master and each slave device that transfers the master privilege. In a method similar to the "data synchronization member registration", the set data held by the master is transferred to a slave, and the set data held by the slave is transferred to the master. The data held by each of the master and slave is exchanged intact. Individual members do not have data concerning another device each other, and thus, these individual members do not affect those in another data synchronization group. Thus, processing can be performed safely and simply as in the "data synchronization member registration".

Figure 14:
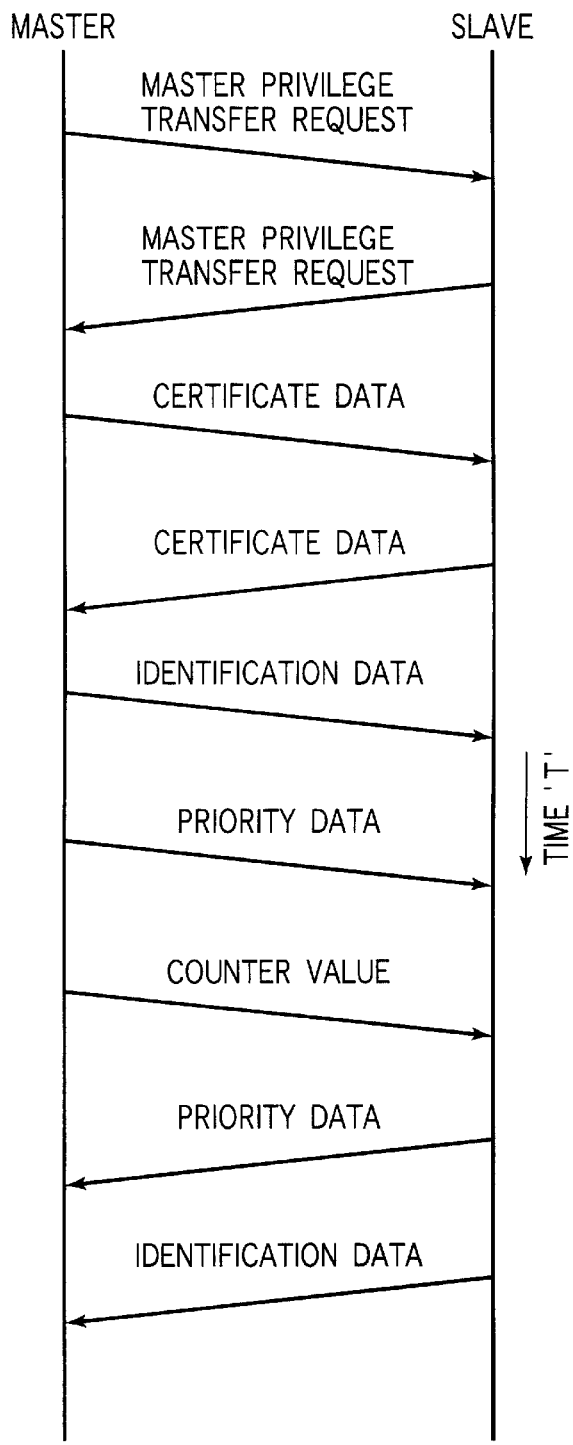
FIG. 14 is a view showing master and slave data exchange in master privilege transfer processing according to the present embodiment.

Now, the "master privilege transfer" function will be described in detail,

Here, master and slave communication processing to be performed together with the "master privilege transfer" processing will be described with reference to FIG. 14.

First, both of the master and the slave transmit a master privilege transfer request to each other. When both of them receive this request, they transmit certificate data for device authentication. After authentication processing, the master transmits the identification data, priority data, and counter value to the slave. Alternatively, the slave transmits the priority data and identification data, and communication processing is completed.

Figure 15:
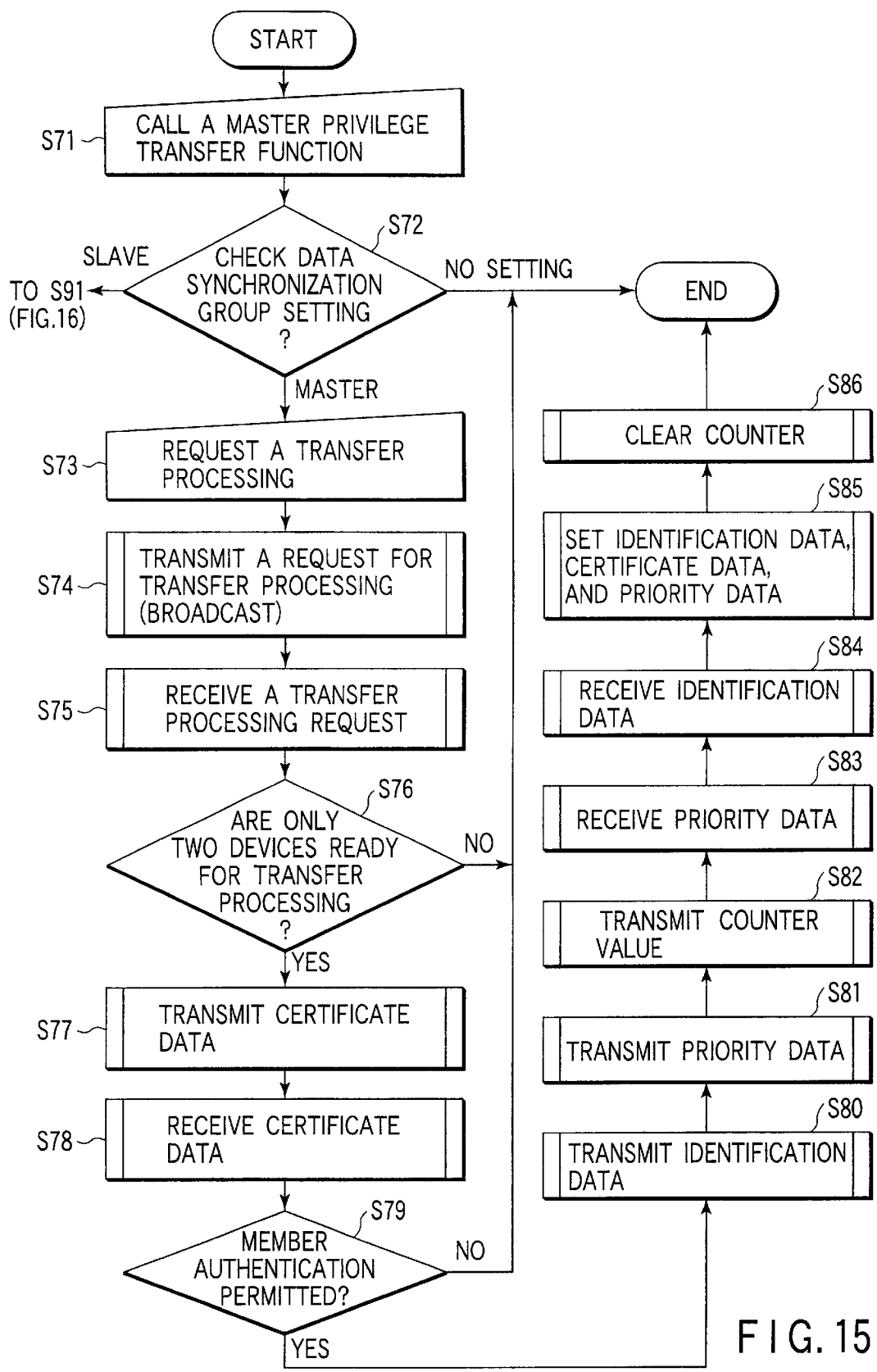
FIG. 15 is a flow chart showing procedures for master processing during master privilege transfer processing according to the present embodiment.

Now, the processing steps in each device will be described in detail. FIG. 15 shows the processing steps in a master device having the "master privilege transfer" function. A description will be given with reference to FIG. 3.

When the device input/output device 13 receives the "master privilege transfer" request from the user (step S71), the data synchronization group setting and management unit 16 judges the current setting of the own device in the data synchronization group (step S72). When the device is a master, the device input/output device 13 continuously waits for a request for executing processing from the user. When the device input/output device 13 receives a request for executing processing (step S73), the communication device 11 transmits a request for master privilege transfer processing in a broadcasting manner (step S74). Then, the communication device 11 waits a request for such transfer processing from the counterpart device. When such request from the counterpart device arrives (step S75), the communication device 11 and the communication controller 12 determine whether or not only the own device and the counterpart device are executable the master privilege transfer processing (step S76). In the case of affirmative determination (YES at the step S76), the communication device 11 transmits certificate data to the counterpart device (step S77). The sequence of the steps of transferring certificate data and determining the number of executable devices may be reversed. When the communication device 11 receives certificate data from the counterpart device (step S78), the authentication unit 15 and data synchronization group setting and management unit 16 authenticate the counterpart device, and determines that the counterpart device exists in the same data synchronization group as the master (step S79). If authentication fails, processing terminates (NO at the step S79). When authentication is successful (YES at the step S79), the data synchronization group setting and management unit 16, communication controller 12, and communication device 11 transmit the identification data, priority data, and counter value owned by the own device to the slave (steps S80, S81, and S82). Then, the communication device 11 receives the priority data and identification data from the slave (steps S83 and S84). The data synchronization group setting and management unit 16 sets the priority data, certificate data, and identification data received from the slave as own priority data, certificate data, and identification data (step S85), and resets the counter. Then, processing terminates (step S86). In this manner, a device that has been a master is specified as a slave device.

The timings of transmitting the priority data, counter value, certificate data, and identification data owned by the own device (steps S77, S80, S81, and S82) and those of receiving the priority data, certificate data, and identification data from a slave (steps S78, S83, and S84) may be in accordance with an arbitrary sequence.

Figure 16:
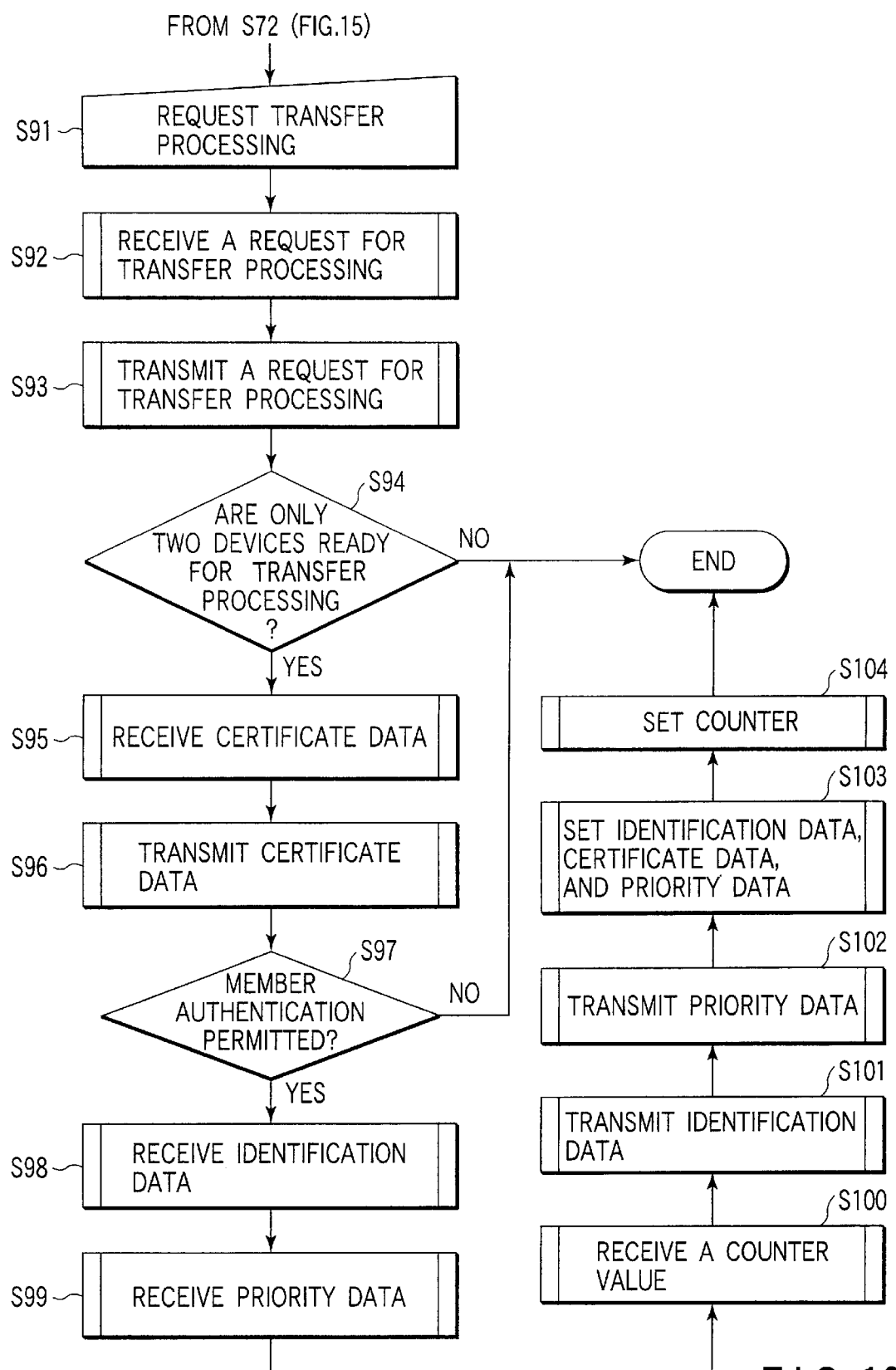
FIG. 16 is a flow chart showing procedures for slave processing during master privilege transfer processing according to the present embodiment.

Slave operations are generally similar to master operation. The processing steps are shown in FIG. 16.

When the device input/output device 13 receives a "master privilege transfer" request from the user, as described in FIG. 15, the data synchronization group setting and management unit 16 judges the current setting of the own device in the data synchronization group. In the case where this setting is not provided, processing terminates. When the device is a master, the aforementioned master operation is performed. In the case where it is determined as a slave, the device input/output device 13 waits for a request for executing master privilege transfer processing from the user. When the user executes master privilege transfer processing for the device input/output device 13 (step S91), the communication device 11 receives a master privilege transfer request from a master (step S92), and transmits the master privilege transfer request to the master (step S93). Then, at the step S94, the communication device 11 and the communication controller 12 check the number of devices that are executable for master privilege transfer processing. In the case where only one device other than own device is executable (YES at the step S94), it goes to the following steps.

First, the certificate data is exchanged with the master (steps S95 and S96). Then, the authentication unit 15 and the data synchronization group setting and management unit 16 authenticates the counterpart (step S97). After authentication, in the case where the communication counterpart is not a master of the data synchronization group to which the own device belong (NO at the step S97), processing terminates. In the case where the counterpart is the master (YES at the step S97), the priority data, counter value, and identification data owned by the master is received from the communication device 11 (steps S99, S100, and S101). Then, after the priority data and identification data owned by the own device have been transferred from the communication device 11 (steps S101 and S102), the data synchronization setting and management unit 16 sets the received master's identification data, certificate data, priority data, and counter value as own data (steps S103 and S104), and processing terminates.

The data synchronization group master can be set by each data set. In the case where a master device has a plurality of data sets, the master privilege transfer processing may be performed for only set data concerning a specific data set specified by the user. Of course, if a slave device specified as a transfer destination has a plurality of data sets, the master privileges concerning all the data sets owned by the master device can be transferred to one slave device in all.

(6) Priority Exchange

A "priority exchange" function exchanges the priorities owned by two slaves with each other. If a conflict occurs during data synchronization, such conflict is solved by using data on a member with its higher priority. The priority is assigned from the master in registration order. Thus, there can occur a case in which the user wants to cause the data on a slave registered later to precede the data on a slave registered previously. Although the priority may be selected during data synchronization member registration, the master or slave requires a display interface for selecting the priority. Here, devices are numbered in registration order for the purpose of simplification of processing so that priorities can be exchanged. At the time of "priority exchange" as well, as is the case with "data synchronization member registration" or "master privilege transfer", processing is performed only when only two devices are set.

Figure 17:
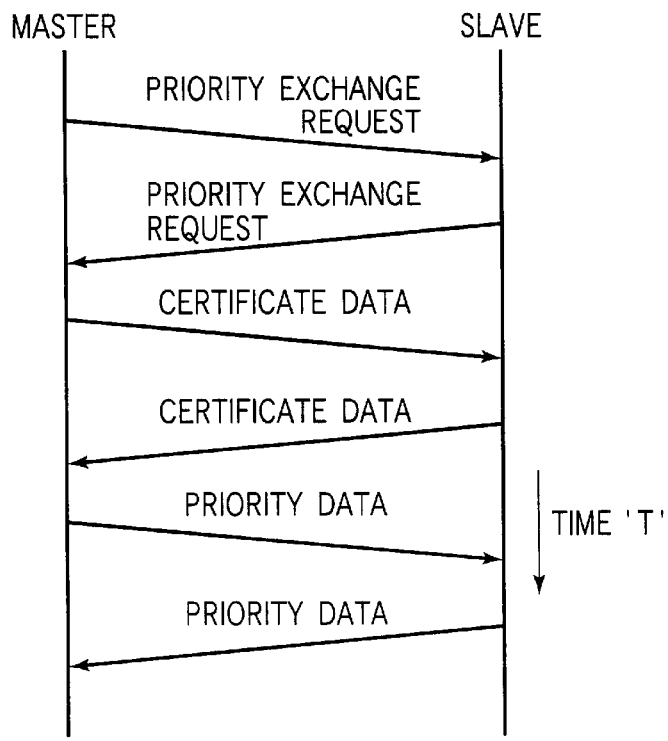
FIG. 17 is a view showing data exchange between devices during priority exchange in the present embodiment.

Now, the communication processing step when the priorities are exchanged between slaves will be described with reference to FIG. 17.

First, slaves that want to exchange priorities transmit a priority exchange request to each other. When one slave receives such request, both of them transmit certificate data to each other. After it has been determined that the slaves belong to the same data synchronization group, both exchange priority data, and communication processing terminates.

Figure 18:
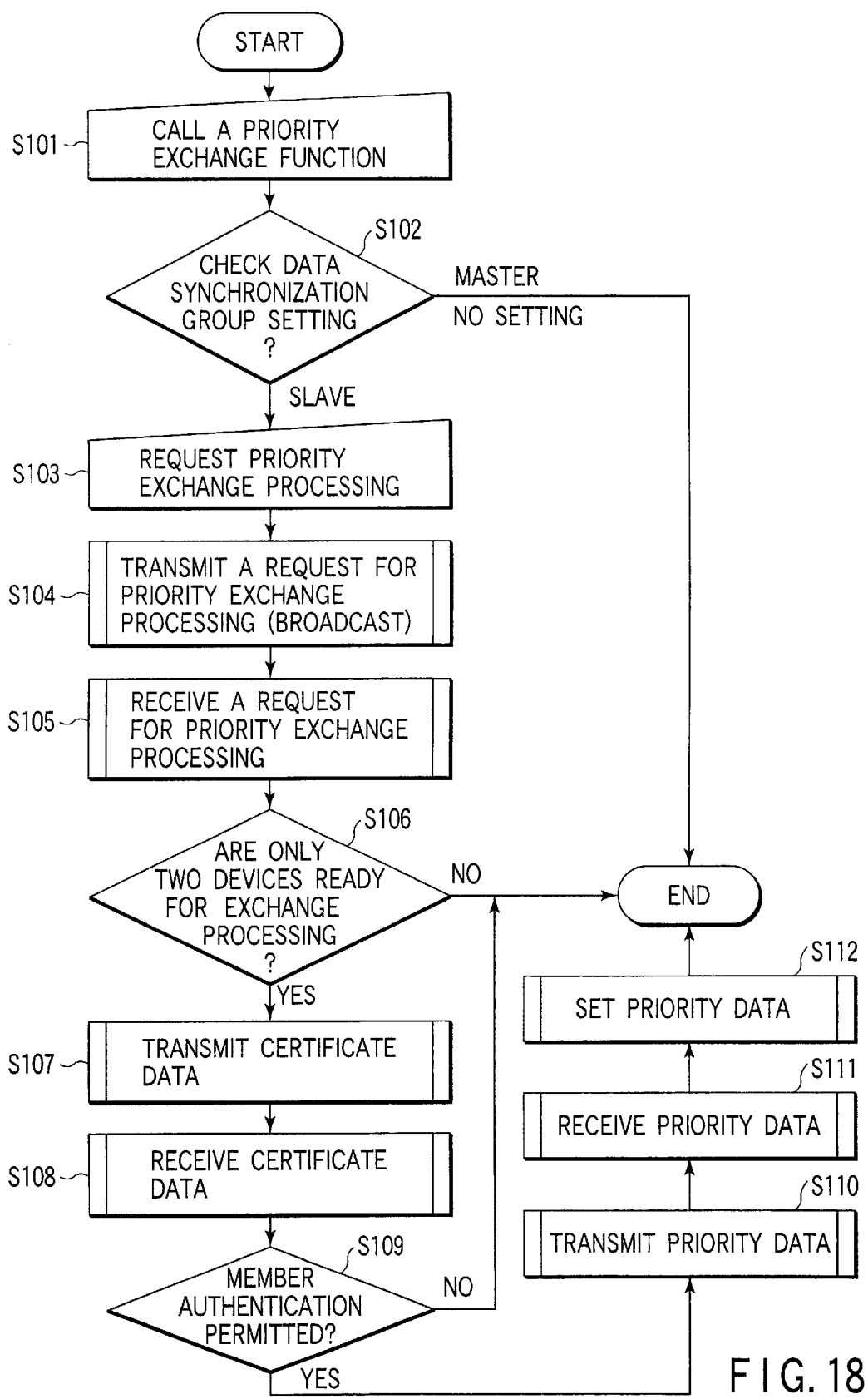
FIG. 18 is a flow chart showing procedures for device processing in priority exchange processing according to the present embodiment.

In FIG. 18, there is shown the processing step of "priority exchange" in each slave device that exchanges the priority.

When the device input/output device 13 receives a "priority exchange" request from the user (step S101), the data synchronization group setting and management unit 16 judges the current setting of the own device in the data synchronization group. In the case where the setting is not provided or in the case of a master, processing terminates. In the case of a slave, the device input/output device 13 waits for a request for executing processing from the user. When the device input/output device 13 receives a request for executing processing (step S103), the communication device 11 transmits a request for processing "priority exchange" in a broadcasting manner, and waits for such request for processing "priority exchange" from the counterpart that exchange the priority. Then, when the communication device 11 receives a request for processing "priority exchange" from the counterpart (step S105), the communication controller 12 determines the number of devices that are currently executable for "priority exchange" (step S105) by using the data from the communication device 11 (step S106). In the case where only one device other than the own device is executable for "priority exchange" (YES at the step S106), the data synchronization group setting and management unit 16, communication controller 12, and communication device 11 receive and/or transmit certificate data from and/or to each other (steps S107 and S108). If three or more devices are executable within a communicable range (NO at the step S106), processing is terminated.

After certificate data has been transmitted and/or received, the authentication unit 15 and the data synchronization group setting and management unit 16 authenticate the communication counterpart based on the authentication data received at the communication device 11 (step S109). When it is authenticated that the counterpart device is a member of the same synchronization group (YES at the step S109), the own device transmits own priority data, and receives the counterpart's priority data (steps S110 and S111). Then, the data synchronization group setting and management unit 16 rewrites its own priority with the received priority, and terminates processing (step S112).

In the case where a device functions as a slave of the data synchronization group, the device having a plurality of data sets, the processing shown in FIG. 18 may be performed for a data set in which priority exchange is specified by the user.

(7) Method for Setting a Device

During each of the "data synchronization member registration", "priority exchange", and "master privilege transfer" processes, it is required to ensure safety of data communication to be performed together with setting. Therefore, prior to exchange actually set data, two devices targeted for setting are moved to be requested for executing processing. Then, after it is determined as to whether or not only two devices are requested for executing processing in a communicable range, it is required to determine whether or not such setting is continued. A series of these processes will be described in more detail.

In connection to these processes, each device has a set mode and an execute mode. The set mode serves to specify call functions including "data synchronization member registration", "priority change", and "master privilege transfer". The execute mode serves to start actual processing of a function called by the set mode, and make data communication with the set counterpart as required. Therefore, this execute mode means a request for executing processing.

Figure 19:
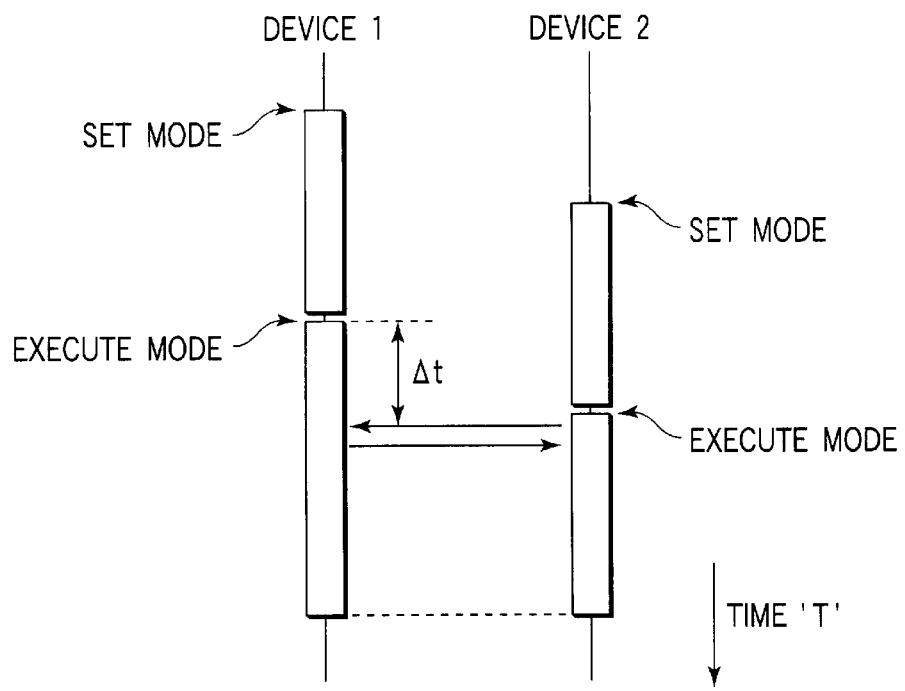
FIG. 19 is a timing chart showing set mode and execute mode applied to the present embodiment.

In the case where a user attempts to perform "data synchronization member registration", "priority change", or "master privilege transfer", as shown in FIG. 19, the user moves two devices targeted for setting (devices 1 and 2) to the set mode. Then, each device determines which function is called, and determines whether or not the called function is valid in current setting of the own device. For example, in the case where the user attempts to perform "data synchronization member registration", the user determines that the called function is the "data synchronization member registration", and determines whether or not the own device is a mater, slave or none. When the called function is valid, it can go to the execute mode. User's operation is required for the current mode to go to the execute mode.

The user simultaneously moves two devices to the execute mode relevant to the same function (strictly, an error Δt of about 1 second is permitted). At a stage before communication with the counterpart is established in the execute mode, each device waits for data indicating the execute mode from another device. After each device has received the data, each device transmits it to a transmission channel. During this data transmission, a data broadcasting transmission may be repeated with predetermined time intervals, for example. When each device receives data indicating the execute mode of the counterpart, after it is determined that there exists no other device that enters this mode and the devices 1 and 2 communicate with each other, communication of set data is started. In communication of the set data, data is encrypted to ensure security by using an encryption system such as the aforementioned public key encryption system. In the case where there exists any other device entering the execute mode, communication regarding the set data is not performed, and processing is interrupted and terminated.

A method of configuring a data synchronization group and the functions of each device has been described hereinbefore. Now, a specific example of providing devices configuring a data synchronization group will be described here.

Figure 20:
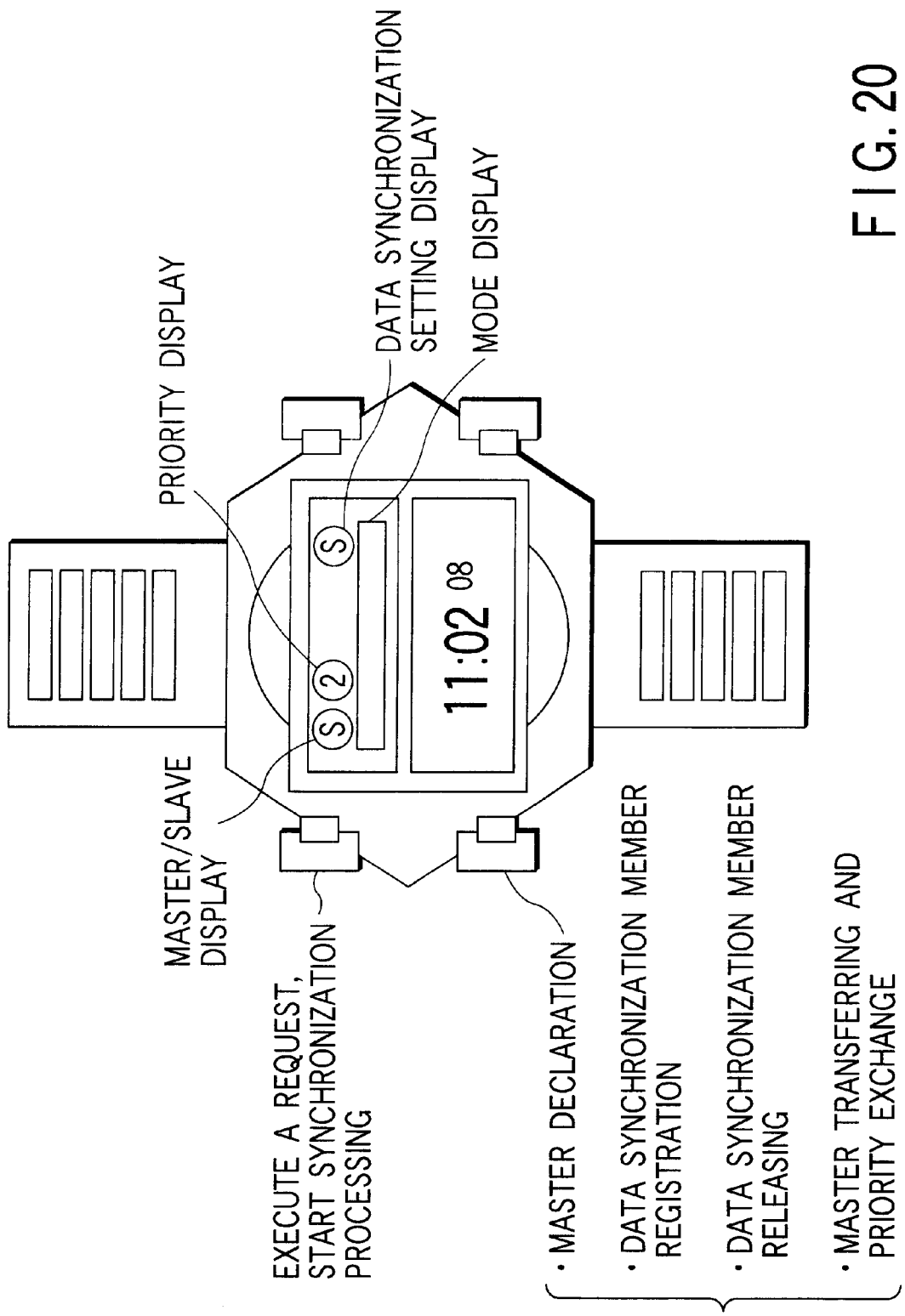
FIG. 20 is a view showing an example of an interface of a wrist watch to which the communication method according to the present embodiment is applied.
Figure 21:
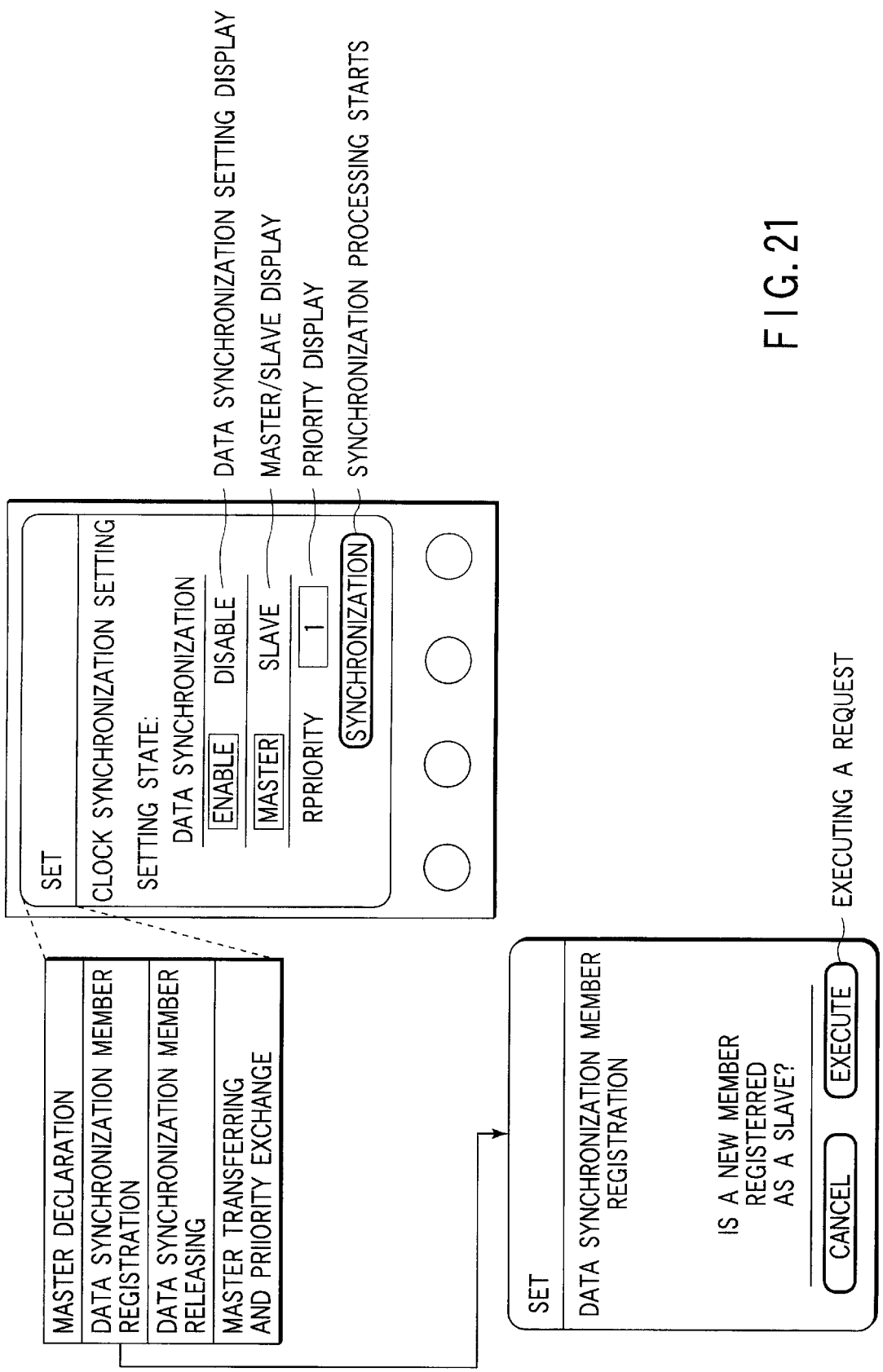
FIG. 21 is a view showing an example of an interface of a portable information terminal to which the communication method according to the present embodiment is applied.

FIG. 20 shows an example when a system for this communication method is applied to a wrist watch, and FIG. 21 shows an example when this system is applied to a portable information processing terminal.

In the wrist watch shown in FIG. 20, sections associated with data synchronization are two buttons that exist at the left of a character board and four display sections at the upper part of a clock display section. The two buttons include an upper left button employed to instruct a request for executing each function for setting a data synchronization group and for instructing the start of data synchronization processing; and a lower left button for selecting each function for setting a data synchronization group. The display sections include a mode display section for displaying each function for setting a data synchronization group; a display section for displaying a character M or S that represents a master or slave; a display section indicating a numeric value of priority data; and a display section indicating whether or not a data synchronization group is currently set. For a description of use, procedures for executing two typical functions, "data synchronization member registration" and "data synchronization processing" will be discussed here.

First, the "data synchronization member registration" will be described here. The lower left button is used to call a "data synchronization member registration" mode. The mode display section displays that the "data synchronization member registration" function has been called. When this call is valid, the user holds down the upper left button, and executes a request for "data synchronization member registration." In this example, if this wrist watch is registered as a member by a given master, the similar procedures are performed in the master as well. When the aforementioned "data synchronization member registration" processing is successful while both devices execute the request, registration processing completes. In the case of "data synchronization processing", the upper left button is first pressed, whereby a function for starting synchronization processing is executed. If one or more devices belong to the same synchronization group that exists in a communicable range, and that can execute synchronization processing, data synchronization processing is actually started. The start of data synchronization processing may be executed by any one device calling the corresponding function or may be executed by all the devices calling the data synchronization processing start functions simultaneously, all of these devices being actually targeted for data synchronization processing at this time.

A data set that the wrist watch has is generally limited to time data (clock data). Thus, a device targeted for data synchronization processing with the wrist watch is a device that belongs to a data synchronization group concerning time data (clock data) in the devices that exist in a range communicable with the wrist watch.

In FIG. 21, there is shown an example of the screen for setting data synchronization of a portable information processing terminal. Shown here is an example of the screen for setting data synchronization concerning time data. This screen is composed of a "set menu" for calling each function provided at the upper left part; a display section that is set to display the current settings; and an execute button for starting data synchronization processing, the button being provided at the lower left. In the case where an attempt is made to perform data synchronization with a device that exists in the range communicable with the portable information processing terminal, belongs to the same data synchronization group capable of executing synchronization processing, a synchronization button at the lower right is pressed, whereby the data synchronization processing is called. In addition, the "data synchronization member registration" is selected from the set menu, whereby the data synchronization member registration screen is displayed. The execute button provided on this screen is held down, whereby the function for data synchronization member registration can be executed in the same manner as in the foregoing example of the wrist watch.

As has been described above, according to the communication method of the present embodiment, there is no need to provide set data concerning a communication counterpart for data synchronization. Basically, data synchronization processing can be performed safely and reliably by a certificate (certificate data) and a priority. Thus, data synchronization processing can be performed between arbitrary slaves without requiring a master. In particular, the present invention is preferable to application to a device that makes wireless communication outside. Moreover, synchronization processing of a data set that belongs to the same data synchronization group is automatically executed with another device that exists in a communicable range by instructing the start of synchronization processing. Therefore, in a device having only a limited user interface such as wrist watch or portable cellular phone, the device being difficult in setting concerning a communication counterpart as well, data synchronization can be easily performed by data synchronization group such that a group member is dynamically changed.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents. For example, although each embodiment has been described singly, a plurality of embodiments may be combined with each other as required. The communication method according to the present embodiment can be achieved by a computer program. Thus, the computer program is recorded in a computer readable recording medium such as CD-ROM, and then, is introduced into the computer or the computer program is recorded into the recording medium such as ROM, and then, is merely incorporated into an electronic device, making it possible to achieve an effect similar to the present embodiment using a general electronic device.

As has been described above,'s according to the present invention, it is possible to provide a communication method and electronic device that enables data synchronization between arbitrary devices without requiring a server. It is possible to perform data synchronization with a device that does not have a limited input device and a display device. It is possible to make communication for data synchronization safely between arbitrary devices in a wired or wireless network such that a network configuration dynamically changes. In exchanging set data between devices, only specific two devices perform setting operations simultaneously after the presence of two set devices has been guaranteed, whereby setting can be done safely.

What is claimed is:

1. A data synchronization method comprising:
    transmitting from a master device to one of a plurality of slave devices a certificate indicating that the one of the plurality of slave devices belongs to a data synchronization group to which the master devices belongs and a priority to be used for solving conflict of data, thereby registering the one of the plurality of slave devices as a member of the data synchronization group to which the master device belongs; and
    determining whether or not a first slave device and a second slave device which is capable of communicating with the first slave device belong to the same data synchronization group by using the certificate, and performing data synchronization between the first slave device and the second slave device based on the priority if the first slave device and the second slave device belong to the same data synchronization group.

2. The method according to claim 1, wherein said registering is performed after it is confirmed that there is no other device than said master device and said one of the plurality of slave devices, which other device is capable of communicating with said master device and is set in a registration mode.

3. The method according to claim 1, wherein additional data synchronization is performed between one master device and one or more slave devices which belong to the same synchronization group.

4. The method according to claim 1, wherein said master device and said one of the plurality of slave devices store plural types of data and belong to plural data synchronization groups defined for each of said plural types of data.

5. The method according to claim 4, wherein said registering is performed by transmitting said certificate and said priority from the master device belonging to a given synchronization group defined for a given type of data to the one of the plurality of slave devices belonging to the given synchronization group, said certificate and said priority being set depending on the given type of data.

6. The method according to claim 1, further comprising transmitting data required to operate as the master device from said master device to a slave device which is targeted to transfer a master privilege, thereby transferring the master privilege to the slave device which is targeted to transfer the master privilege.

7. The method according to claim 6, wherein said master privilege transferring is performed after it is confirmed that there is no other slave device than said master device and said slave device which is targeted to transfer the master privilege, which other slave device is capable of communicating with said master device and is set in a master privilege transfer mode.

8. The method according to claim 1, further comprising exchanging the priority between slave devices that belong to the same data synchronization group.

9. The method according to claim 8, wherein said priority exchanging is performed after it is confirmed that there is no other slave device than said master device and said one of the plurality of slave devices, which other slave device is capable of communicating with said master device and is set in a priority exchanging mode.

10. The method according to claim 1, further comprising releasing said master device or said one of the plurality of slave devices from the data synchronization group, wherein, if said master device is released, said master device transmits a releasing instruction to a slave device which is capable of communicating with said master device to release said slave device which is capable of communicating with said master device.

11. A computer readable recording medium storing a computer program for data synchronization between plural devices, the program comprising:

first program code means causing a master device to transmit to one of a plurality of slave devices a certificate indicating that the slave device belongs to a data synchronization group to which the master device belongs and a priority to be used for solving conflict of data, thereby registering the slave device as a member of the data synchronization group to which the master device belongs; and first program code means causing a first slave device and a second slave device to determine whether or not the first slave device and the second slave device which is capable of communicating with the first slave device belong to the same data synchronization group by using the certificate, and perform data synchronization between the first slave device and the second slave device based on the priority if the first slave device and the second slave device belong to the same data synchronization group.

12. The computer readable recording medium according to claim 11, wherein said registering is performed after it is confirmed that there is no other device than said master device and said one of the plurality of slave devices, which other device is capable of communicating with said master device and is set in a registration mode.

13. The computer readable recording medium according to claim 11, wherein additional data synchronization is performed between one master device and one or more slave devices which belong to the same synchronization group.

14. The computer readable recording medium according to claim 11, wherein said data synchronization group is formed of a type of data.

15. The computer readable recording medium according to claim 14, wherein said registering is performed by transmitting said certificate and said priority from the master device set by a user for a given type of data to one of the plurality of the slave devices set by the user for the given type of data, said certificate and said priority being set dependent on the type of data.

16. The computer readable recording medium according to claim 11, wherein said program further comprises third program code means causing said master device to transmit data required to operate as the master device to a slave device which is targeted to transfer a master privilege, thereby transferring the master privilege to the slave device which is targeted to transfer the master privilege.

17. The computer readable recording medium according to claim 16, wherein said master privilege transferring is performed after it is confirmed that there is no other slave device than said master device and said slave device which is targeted to transfer the master privilege, which other slave device is capable of communicating with said master device and is set in a master privilege transfer mode.

18. The computer readable recording medium according to claim 11, wherein said program further comprises fourth program code means for causing slave devices that belong to the same data synchronization group to exchange the priority.

19. The computer readable recording medium according to claim 18, wherein priority exchanging is performed after it is confirmed that there is no other slave device than said master device and said one of the plurality of slave devices, which other slave device is capable of communicating with said master device and is set in a priority exchanging mode.

20. The computer readable recording medium according to claim 1, wherein said program further comprises fifth program code means for causing said master device or said one of the plurality of slave devices to be released from the data synchronization group, and if said master device is released, causing said master device to transmit a releasing instruction to a slave device which is capable of communicating with said master device to release said slave device which is capable of communicating with said master device.

21. An electronic device comprising:

a master unit, when an own device is set by a user as a master, configured to transmit to a slave device a certificate indicating that the slave device belongs to a data synchronization group to which the master device belongs and a priority to be used for solving conflict of data, thereby registering the slave device as a member of the data synchronization group to which the master device belongs;

a slave unit, when the own device is set by the user as the slave, configured to receive from a master unit a certificate and a priority; and a data synchronization unit configured to determine whether or not the own device and another device which is capable of communicating with the own device belong to the same data synchronization group by using one of the certificates, and perform data synchronization between the own device and the other device based on one of the priorities if the own device and the other device belong to the same data synchronization group.

* * * * *